United States Patent
Erinjippurath et al.

(10) Patent No.: US 9,329,430 B2
(45) Date of Patent: May 3, 2016

(54) DUAL PANEL DISPLAY WITH CROSS BEF COLLIMATOR AND POLARIZATION-PRESERVING DIFFUSER

(75) Inventors: Gopal Erinjippurath, San Francisco, CA (US); John Gilbert, Pacifica, CA (US); Giorgio Giaretta, Scotch Plains, NJ (US); Vincent Kwong, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 62 days.

(21) Appl. No.: 14/113,896

(22) PCT Filed: Apr. 25, 2012

(86) PCT No.: PCT/US2012/034940
§ 371 (c)(1),
(2), (4) Date: Oct. 25, 2013

(87) PCT Pub. No.: WO2012/148983
PCT Pub. Date: Nov. 1, 2012

(65) Prior Publication Data
US 2014/0049734 A1 Feb. 20, 2014

Related U.S. Application Data

(60) Provisional application No. 61/479,966, filed on Apr. 28, 2011.

(51) Int. Cl.
*G02F 1/1335* (2006.01)
*G09G 3/36* (2006.01)
(Continued)

(52) U.S. Cl.
CPC ...... *G02F 1/133536* (2013.01); *G02F 1/13471* (2013.01); *G02F 1/133504* (2013.01);
(Continued)

(58) Field of Classification Search
CPC .......... G02F 1/133536; G02F 1/13471; G09G 3/3611
USPC ...................................................... 349/74, 96
See application file for complete search history.

(56) References Cited

U.S. PATENT DOCUMENTS 5,589,963 A 12/1996 Gunning, III
5,682,180 A 10/1997 Young
(Continued)

FOREIGN PATENT DOCUMENTS

CN 101458418 6/2009
EP 1843193 10/2007
(Continued)

OTHER PUBLICATIONS

"Transflective Film: Testing Shows It Fails to Create Sunlight-Readable Displays, Despite Industry Claims" by Jim Lee.*
(Continued)

*Primary Examiner* — Sang V Nguyen

(57) ABSTRACT

A display including an image-generating panel and at least one contrast-enhancing panel, a cross BEF collimator between a backlight and one of the panels, and a polarization-preserving diffuser (e.g., holographic diffuser) between the panels. Typically, the contrast panel is upstream of the image panel, and a reflective polarizer is positioned between the cross BEF collimator or and contrast panel, with the reflective polarizer oriented relative to an initial polarizer of the contrast panel. Polarization of light transmitted by the reflective polarizer matches that transmitted by the initial polarizer. Collimated light propagating from the cross BEF collimator toward the contrast-enhancing panel is given a polarization bias by the reflective polarizer, which reflects incorrectly polarized light back toward the cross BEF collimator. Alternatively, the reflective polarizer may be positioned between the cross BEF collimator and the image-generating panel when the image-generating panel is upstream of the contrast-enhancing panel.

19 Claims, 10 Drawing Sheets

(51) Int. Cl.
*G02F 1/1347* (2006.01)
*G09G 3/34* (2006.01)

(52) U.S. Cl.
CPC ........ *G02F1/133606* (2013.01); *G09G 3/3611* (2013.01); *G02F 2001/133507* (2013.01); *G02F 2001/133607* (2013.01); *G09G 3/3413* (2013.01); *G09G 2300/023* (2013.01); *G09G 2320/0646* (2013.01); *G09G 2340/06* (2013.01)

(56) References Cited

U.S. PATENT DOCUMENTS

| | | | |
|---|---|---|---|
| 5,751,390 A | 5/1998 | Crawford | |
| 6,348,957 B1 | 2/2002 | Yamazaki | |
| 6,788,360 B2 * | 9/2004 | Penterman et al. | 349/74 |
| 6,846,089 B2 | 1/2005 | Stevenson | |
| 7,184,007 B2 | 2/2007 | Tsai | |
| 7,400,377 B2 | 7/2008 | Evans | |
| 7,419,267 B2 | 9/2008 | Whitehead | |
| 7,440,045 B2 | 10/2008 | Huang | |
| 7,446,827 B2 | 11/2008 | Ko | |
| 7,524,099 B2 | 4/2009 | Moon | |
| 7,528,900 B2 | 5/2009 | Chang | |
| 7,630,030 B2 | 12/2009 | Jang | |
| 7,671,940 B2 | 3/2010 | Li | |
| 7,789,538 B2 | 9/2010 | Epstein | |
| 7,796,210 B2 | 9/2010 | Huang | |
| 7,843,529 B2 | 11/2010 | Ikeno et al. | |
| 2004/0008298 A1 | 1/2004 | Kwok | |
| 2006/0125975 A1 | 6/2006 | Mai | |
| 2006/0139503 A1 * | 6/2006 | Larson et al. | 349/39 |
| 2006/0146539 A1 | 7/2006 | Weng | |
| 2006/0164578 A1 * | 7/2006 | Matsumoto | G02B 5/3083 349/117 |
| 2006/0203338 A1 * | 9/2006 | Pezzaniti | G02B 27/26 359/465 |
| 2006/0232724 A1 | 10/2006 | Hsieh | |
| 2007/0019393 A1 | 1/2007 | Tsai | |
| 2007/0097504 A1 | 5/2007 | Li | |
| 2007/0242028 A1 * | 10/2007 | Kitagawa | G02F 1/133504 345/100 |
| 2007/0242186 A1 * | 10/2007 | Ikeno et al. | 349/74 |
| 2008/0043303 A1 * | 2/2008 | Whitehead et al. | 359/19 |
| 2008/0088647 A1 * | 4/2008 | Marcu et al. | 345/690 |
| 2008/0088649 A1 * | 4/2008 | Ikeno | G09G 3/3611 345/690 |
| 2008/0111948 A1 | 5/2008 | Epstein | |
| 2008/0112184 A1 * | 5/2008 | Epstein | G02F 1/133606 362/600 |
| 2008/0129930 A1 | 6/2008 | Little | |
| 2009/0274876 A1 | 11/2009 | Liou | |
| 2009/0295707 A1 | 12/2009 | Furukawa | |
| 2009/0316082 A1 | 12/2009 | Bae | |
| 2011/0075070 A1 | 3/2011 | Kitagawa | |
| 2012/0026428 A1 | 2/2012 | Yamahara et al. | |
| 2012/0062607 A1 | 3/2012 | Erinjippurath | |

FOREIGN PATENT DOCUMENTS

| | | |
|---|---|---|
| JP | 2007-214142 | 8/2007 |
| JP | 2010-049937 | 3/2010 |
| KR | 10-2007-0103321 | 10/2007 |
| KR | 10-2008-0034820 | 4/2008 |
| KR | 10-2008-0043077 | 5/2008 |
| KR | 10-2008-0047761 | 5/2008 |
| KR | 10-2008-0062790 | 7/2008 |
| TW | 200717103 | 5/2007 |
| WO | 03/007684 | 1/2003 |
| WO | 2005/019910 | 3/2005 |
| WO | 2006/044292 | 4/2006 |
| WO | 2006/046168 | 5/2006 |
| WO | 2006/124588 | 11/2006 |
| WO | 2009/009326 | 1/2009 |
| WO | 2011/143211 | 11/2011 |
| WO | 2012/149001 | 11/2012 |

OTHER PUBLICATIONS 3M films, BEF, DBEF tutorials on the 3M website http://solutions.3m.com/wps/portal/3M/en_US/Vikuiti1/BrandProducts/secondary/vikuititutorials/prismfilmstutorial/http://solutions.3m.com/wps/portal/3M/en_US/Vikuiti1/BrandProducts/secondary/vikuititutorials/reflectivepolarizers/.

Joo, B.Y. et al "Design Guidance of Backlight Optic for Improvement of the Brightness in the Conventional Edge-Lit LCD Backlight" Apr. 2010, vol. 31, Issue 2, pp. 87-92.

Wadle, S. et al "Holographic Diffusers Polarization Effects" Optical Engineering, Soc. of Photo-Optical Instrumentation Engineers, Bellingham, vol. 33, No. 4, Apr. 1, 1994, pp. 1084-1088.

* cited by examiner

DUAL PANEL DISPLAY WITH CROSS BEF COLLIMATOR AND POLARIZATION-PRESERVING DIFFUSER

CROSS-REFERENCE TO RELATED APPLICATIONS

This application claims priority to U.S. Provisional Patent Application No. 61/479,966 filed 28 Apr. 2011, which is hereby incorporated by reference in its entirety.

BACKGROUND OF THE INVENTION

1. Field of the Invention

In a class of embodiments, the invention relates to a dual LCD panel display including two modulating LCD panels: an achromatic LCD panel and a color LCD panel. In a class of embodiments, the inventive dual LCD panel display includes an achromatic LCD panel, a color LCD panel, a backlight assembly, a cross BEF ("brightness enhancing film") collimator between the backlight assembly and one of the color LCD panel and the achromatic LCD panel, and a polarization-preserving diffuser between the achromatic LCD panel and the color LCD panel.

2. Background of the Invention

Throughout this disclosure including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the noun "display" and the expression "display system" are used as synonyms. The expression "high dynamic range" display (HDR display) herein denotes a display having a dynamic range of greater than 800 to 1. Recent advances in technology have produced displays claiming contrast ratios of more than 1,000,000 to 1.

Throughout this disclosure including in the claims, the expression "dual LCD panel display" is used to denote a display system including two modulating LCD panels (an achromatic LCD panel and a color LCD panel), and a backlight system for illuminating the LCD panels. The backlight system can be a spatially variable backlight system (e.g., a spatially variable backlight panel comprising an array of individually controllable LEDs, or other spatially variable backlight panel) or a fixed backlight. The achromatic LCD panel and the color LCD panel are arranged so that one (a "first" one) of them is backlit by the backlight system and the other one of them is backlit by light transmitted through the first one of the LCD panels. A dual LCD panel display whose backlight system is a spatially variable backlight system is an example of a "dual modulation display" as defined herein.

Throughout this disclosure, the expression "dual modulation display" is used to denote a display system including a modulating front LCD panel system and a spatially variable backlight system (e.g., a spatially variable backlight panel comprising an array of individually controllable LEDs, or another spatially variable backlight panel) for backlighting the front LCD panel system. Examples of a modulating front LCD panel system of a dual modulation display include (but are not limited to) a single LCD panel comprising an array of LCD elements; and two LCD panels (an achromatic LCD panel and a color LCD panel) arranged so that one (a "first" one) of the LCD panels is backlit by the backlight system and the other one of the LCD panels is backlit by light transmitted through the first one of the LCD panels.

An optical element which is a film or layer having "uniaxial symmetry" herein denotes an optical element having a major surface which is at least substantially flat, and having a normal axis (perpendicular to the surface) and two orthogonal axes (sometimes denoted herein as "surface" axes or "X" and "Y" surface axes for convenience) that are perpendicular to the normal axis, and wherein the optical properties of the film or layer are at least substantially uniform with respect to a first one of the surface axes (the "X" surface axis) but not with respect to the other one of the surface axes (the "Y" surface axis). The major surface may be "at least substantially flat" although it has surface features (e.g., ridges) which are small relative to the overall size of the optical element and which make the surface non-flat on the (small) length scale of such features. An optical element which is a film or layer having "uniaxial symmetry" does not have radial symmetry in a plane orthogonal to its normal axis. In use in an optical system (e.g., a dual LCD panel display), an optical element which is a film or layer having "uniaxial symmetry" is typically oriented with its normal axis aligned at least substantially with the system's optical axis.

Herein, the expression "BEF" (or "brightness enhancing film") denotes an optical element which is a film or layer having uniaxial symmetry and which is configured to selectively transmit and/or reflect incident light depending (in accordance with a first transfer function) on the light's angle of incidence in the plane defined by the optical element's normal axis and a first one of its surface axes (e.g., the "X" surface axis), but to have transmissivity and reflectivity that depend (in accordance with a different transfer function) on the angle of incidence in the orthogonal plane defined by the normal axis and the other one of the surface axes (e.g., the "Y" surface axis). A BEF may have features (e.g., ridges) which are small relative to the overall dimensions of its major surface, and which extend into and/or out from the surface parallel to the normal axis. Thus, a BEF would not have the same collimation functionality with respect to both of its orthogonal surface axes, although an optical element consisting of two identical BEFs with their major surfaces parallel to each other but oriented with their "X" surface axes offset with respect to each other by 90 degrees could have the same collimation functionality with respect to both of its orthogonal surface axes.

A typical BEF is a sheet (e.g., of polymer material) imprinted with a prismatic surface pattern, which resembles a saw tooth pattern extending inward and outward from the sheet's normal axis. The prisms cause the BEF to redirect (reflect) incident light (e.g., from the backlight of an LCD display) that is not incident at a high angle of incidence, and to transmit light that is incident at a high angle of incidence (e.g., light that is propagating almost perpendicular to the BEF's normal axis). Light reflected from the BEF may be re-reflect from other elements, so as to be incident again at the BEF this time with an incidence angle such that it is transmitted through the BEF (e.g., to increase the brightness of an image displayed by a backlit LCD display system including the BEF relative to the brightness that the image would have if the BEF were omitted from the display system).

An example of a BEF is a "DBEF" (dual BEF) film. A typical DBEF is a sheet (e.g., of polymer material) imprinted with a prismatic surface pattern extending inward and outward from the sheet's normal axis (as described in the previous paragraph) and also including an extra reflective layer for recycling (by reflection) light that is incident at the prisms but not at the correct angle for transmission.

Another example of a BEF is a "BEF-D" (BEF-diffuse) film, which is a multilayer film including a BEF layer (e.g., a DBEF layer, in which case the BEF-D film may be referred to as a "DBEF-D" film) and at least one diffusing layer. In use in a backlit LCD display system, a BEF-D may provide wider viewing angle than that which could be achieved if the BEF-D were replaced in the display system by a BEF film that is not a BEF-D film.

Several embodiments of dual LCD panel displays, other dual panel displays, and high dynamic range displays are described in U.S. patent application Ser. No. 12/780,749, filed on May 14, 2010, by Gopal Erinjippurath and John Gilbert. Several methods and systems for driving the achromatic LCD panel and color LCD panel of a dual LCD panel display are described in that application. U.S. application Ser. No. 12/780,749 notes that various optical elements may be placed at virtually any point in the light/image chain of such a dual LCD panel display, including any of diffusers, collimators, Brightness Enhancement Films (BEFs), and Dual Brightness Enhancement Films (DBEFs).

Contrast ratio is defined as the ratio of the brightest to darkest colors that a display is capable of producing. High contrast ratios are desirable for accurate image reproduction, but are often limited in traditional displays. One traditional display consists of a Liquid Crystal Display (LCD) panel and a backlight, typically a cold cathode fluorescent lamp (CCFL) disposed behind the LCD panel. The display contrast ratio is set by the LCD contrast ratio, which is typically under 1000:1. A dual LCD panel displays can provide a greater contrast ratio than can a traditional display or a dual modulation display that includes only a single LCD panel.

When dual modulation display or dual LCD panel display includes a spatially variable backlight system, the backlight drive values (e.g., LED drive values) should be chosen to achieve an optimal backlight, including by maximizing contrast, while minimizing visual artifacts (e.g., white clipping, black clipping, and halos) and temporal variations of these artifacts and maximizing energy efficiency. The ideal solution balances these criteria for a given application. Preferably, the backlight drive values control the backlight system to mitigate display artifacts such as bright pixel clipping, dark clipping and contouring, and output variation with motion and image deformation.

In a dual modulation display including a spatially variable LED backlight system, the contrast at the LCD front panel system is increased by multiplication by the contrast of the LED backlight. Usually, the backlight layer emits light corresponding to a low-resolution version of an image, and the LCD front panel system (which has a higher resolution) transmits light (by selectively blocking light from the backlight layer) to display a high-resolution version of the image. In effect, the high and low resolution "images" are multiplied optically.

In a dual modulation display including a spatially variable LED backlight system, nearby LCD pixels typically have similar backlighting. If an input image contains pixel values beyond the contrast range of an LCD panel, the backlight will not be optimal for all LCD pixels. Typically the choice of backlighting level for a local area of an LCD panel is not optimal for all LCD pixels in the area. For some LCD pixels the backlight might be too high, while for others the backlight might be too low. The backlighting should be set to best represent the input signal from a perceptual standpoint, i.e., the backlight level should be chosen to allow the best perceptual representation of the bright and dark pixels, which often cannot both be accurately represented.

If backlighting is too high, accurate low levels including black are compromised. Input image pixel values requiring LCD values near the minimum LCD transmittance are contoured (quantized), and pixels requiring LCD values below the minimum LCD transmittance are clipped to the lowest level. If the backlighting is too low, pixels above the backlight level are clipped to the maximum LCD level. These clipping and contouring artifacts may occur in traditional constant backlit LCD displays.

Examples of dual panel displays of the type described in U.S. patent application Ser. No. 12/780,749, each including an image-generating panel (e.g., a color LCD panel but alternatively another image-generating panel) and a contrast-enhancing panel (e.g., an achromatic LCD panel, but alternatively another contrast-enhancing panel), and a backlight, will be described with reference to FIGS. 1, 2, 2A, 3A, 3B, 4A, 4B, 4C, and 4D.

SUMMARY OF THE INVENTION

In a class of embodiments, the inventive dual LCD panel display comprises a color LCD panel (sometimes referred to herein as an "image-generating" panel), an LCD panel without color filters (an achromatic LCD panel), a backlight, a polarization-preserving diffuser between the achromatic LCD panel and the color LCD panel, and a cross BEF ("brightness enhancing film") collimator between the backlight and one of the achromatic LCD panel and the color LCD panel. Each of the color LCD panel and the achromatic LCD panel includes an active layer (including LCD cells) between an initial polarizer and an analyzing polarizer. Thus, in a typical embodiment, the achromatic LCD panel includes two polarizers (an initial polarizer and an analyzing polarizer) and transmits light having a specific polarization, the polarization-preserving diffuser preserves the polarization of this light, and the color LCD panel (which also includes two polarizers: an initial polarizer and an analyzing polarizer) further modulates the light diffused by the polarization-preserving diffuser. The positions of the two LCD panels are reversed in some other embodiments, so that the color LCD panel is upstream from the achromatic LCD panel.

Preferably, the achromatic LCD panel is positioned upstream of the color LCD panel (in the sense that the achromatic LCD panel is between the backlight and the color LCD panel), and a reflective polarizer (implemented as a DBEF-D film, in some embodiments) is positioned between the cross BEF collimator and the achromatic LCD panel, with the reflective polarizer oriented relative to the initial polarizer of the achromatic LCD panel such that the polarization of the light transmitted by the reflective polarizer matches that of the light transmitted by the initial polarizer. The collimated light propagating from the cross BEF collimator toward the achromatic LCD panel is given a polarization bias by the reflective polarizer, which reflects incorrectly polarized light back toward the cross BEF collimator. Preferably, the cross BEF collimator together with the reflective polarizer create a lensing effect which collimates and polarizes light incident at the cross BEF collimator at obtuse angles (from the backlight), and recycles (reflects back toward the backlight) light that is incident at the cross BEF collimator at other (non-obtuse angles) in order to improve the overall efficiency of the optical stack. Alternatively, the reflective polarizer is positioned between the cross BEF collimator and the color LCD panel, in embodiments in which the color LCD panel is upstream of the achromatic LCD panel.

The inventive dual LCD panel display typically also includes an LCD controller configured to generate color panel drive values (determining a drive signal for the color LCD panel) and achromatic panel drive values (determining a drive signal for the achromatic LCD panel). In some embodiments, the inventive dual panel display (e.g., dual LCD panel display) is implemented as a high dynamic range display.

In typical implementations, the achromatic LCD panel is positioned between the backlight (which may comprise an array of backlight sources or a single backlight source) and the color LCD panel, such that in operation, the achromatic LCD panel is backlit and light passing through the achromatic LCD panel from the backlight illuminates the color LCD panel. In a typical implementation, the achromatic LCD panel produces a base version of an image (determined by input image pixels) to be displayed by the display, and the color LCD panel further modulates the base image to produce the image to be displayed. The base image may comprise a brightness intensity in proportion to brightness intensities of the image to be displayed. The brightness intensity of the base image may be a sharper image than the image to be displayed, or the base image may be a blurred approximation of brightness levels in proportion to brightness levels of the image to be displayed. The resolution of the achromatic LCD panel may be higher or lower than (but is typically higher than) that of the color LCD panel.

In some embodiments, the backlight comprises one or more CCFLs, LEDs, and OLEDs. These may be directly illuminating or the light can be carried through a light pipe (e.g., in the case of an edge lit backlight configuration). In some embodiments, the backlight is an array of light sources comprising at least one of the following: white or broad spectrum light sources, RGB light sources, RGBW light sources, RGB plus one or more additional primary light sources, or other multi-primary light source color combinations. The array of light sources (e.g., edge-lit light sources) may be locally dimmed. In one embodiment, the light sources comprise different colors and each color's brightness is individually controllable.

More generally, other embodiments of the invention are a dual panel display including an image-generating panel (e.g., a color LCD panel but alternatively another image-generating panel) and at least one contrast-enhancing panel (e.g., at least one achromatic LCD panel, but alternatively another contrast-enhancing panel), a backlight, a polarization-preserving diffuser between the contrast-enhancing panel and the image-generating panel, and a cross BEF ("brightness enhancing film") collimator between the backlight and one of the image-generating panel and the contrast-enhancing panel. Each of the contrast-enhancing panel and the image-generating panel includes an active layer (which can be driven to modulate light) between an initial polarizer and an analyzing polarizer. Thus, in a typical embodiment, the contrast-enhancing panel includes two polarizers (an initial polarizer and an analyzing polarizer) and transmits light having a specific polarization, the polarization-preserving diffuser preserves the polarization of this light, and the image-generating panel (which also includes two polarizers: an initial polarizer and an analyzing polarizer) further modulates the light diffused by the polarization-preserving diffuser. The positions of the two panels are reversed in some other embodiments, so that the image-generating panel is upstream from the contrast-enhancing panel.

Preferably, the contrast-enhancing panel is positioned upstream of the image-generating panel (in the sense that the contrast-enhancing panel is between the backlight and the image-generating panel), and a reflective polarizer (implemented as a DBEF-D film, in some embodiments) is positioned between the cross BEF collimator and the contrast-enhancing panel, with the reflective polarizer oriented relative to the initial polarizer of the contrast-enhancing panel such that the polarization of the light transmitted by the reflective polarizer matches that of the light transmitted by the initial polarizer. The collimated light propagating from the cross BEF collimator toward the contrast-enhancing panel is given a strong polarization bias by the reflective polarizer, which reflects incorrectly polarized light back toward the cross BEF collimator. Preferably, the cross BEF collimator together with the reflective polarizer create a lensing effect which collimates and polarizes light incident at the cross BEF collimator at obtuse angles (from the backlight), and recycles (reflects back toward the backlight) light that is incident at the cross BEF collimator at other (non-obtuse angles) in order to improve the overall efficiency of the optical stack. Alternatively, the reflective polarizer is positioned between the cross BEF collimator and the image-generating panel, in embodiments in which the image-generating panel is upstream of the contrast-enhancing panel.

It should be understood that in the latter class of embodiments, both panels generate images, and both panels impart contrast into a final image for display. The image-generating panel typically imparts color and contrast through a combination of filtering and brightness modulation, and the contrast-enhancing panel typically imparts contrast, or enhancing contrast, via brightness modulation. It should also be understood that in variations on the described embodiments, the contrast-enhancing panel could also include color filtering, or other variations of function in one or both of the contrast-enhancing panel and the image-generating panel could be implemented.

DESCRIPTION OF THE PREFERRED EMBODIMENTS

Figure 1:
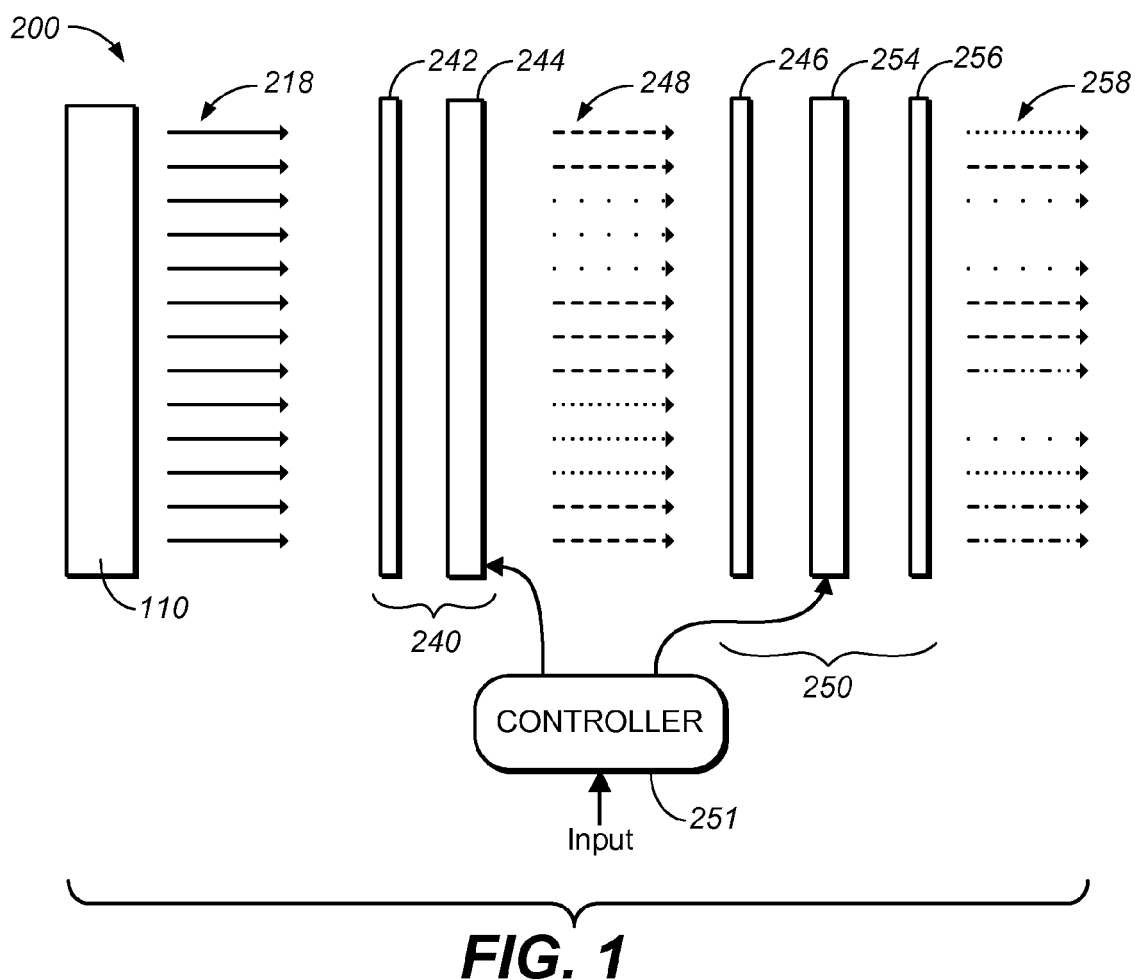
FIG. 1 is a schematic diagram of a dual LCD panel display that can be modified in accordance with an embodiment of the present invention.

Many embodiments of the inventive dual panel display are contemplated, including dual LCD panel display embodiments to be described with reference to FIGS. 1, 2, 3B, 4A, 4B, 4C, 4D, and 5-7. Exemplary embodiments of a controller (for generating drive signals for a color LCD panel and an achromatic LCD panel of a dual LCD panel display) will be described with reference to FIGS. 4A, 4B, 4C, 4D, and 6.

High dynamic range dual LCD panel display 200 (of FIG. 1) includes a backlight 110 which may be a standard CCFL or other broadband lighting source (e.g., LEDs, OLEDs, etc.). Backlight 110 may be direct lit (it may comprise light source(s) that directly illuminate downstream panels 240 and 250) or edge lit (as is popular in many thin screen LCD display designs), and it may emit backlight that is constant, globally dimmed, or locally dimmed. The backlight can be white, of controllable luminance, or multiple color driven.

Backlight 110 illuminates two downstream modulators: color LCD panel 250, and achromatic LCD panel 240 (placed upstream of panel 250). Backlight 210 illuminates achromatic LCD panel 240 with light 218. Achromatic panel 240 produces modulated light 248, which is a locally dimmed version of the backlight 218. Modulated light 248 is further modulated for color and brightness by color LCD panel 250, producing final image light 258. Controller 251 asserts drive signals to the active elements of panels 240 and 250 in response to input image data (e.g., input video).

As shown, achromatic panel 240 includes an initial polarizer 242, and an active elements panel 242 (typically, a layer of twisted nematic crystal ("TN") cells without color filters). Color panel 250 comprises: a polarizer 246 (e.g., an absorptive polarizer) which operates as both an initial polarizer for the color panel and as an analyzer for the active elements panel 242; a color active layer 254 (typically a layer of TN cells and a layer of color filters thereon) which modulates light transmitted through polarizer 246 as to polarization and color; and a passive polarizer 256 which effects the intensity modulation by polarization based filtering.

Polarizer 242 may be a reflective polarizer which reflects light from backlight 110 whose polarization is such that it will not be transmitted through polarizer 242. Light that reflects back to backlight 110 may be "recycled" by re-reflection (with a polarization change) by one or more elements of backlight 110 back toward polarizer 242. For example, in a variation on the implementation shown in FIG. 1, a reflective polarizer (a "backlight assembly reflective polarizer") positioned on (e.g., adhered to) the right face of backlight 110 re-reflects and changes the polarization of light that has been reflected by panel 240 (e.g., by polarizer 242 of panel 240) back toward backlight 110. Such reflections from panel 240 would typically include light that has been reflected back toward backlight 110 from a reflective implementation of polarizer 242 because the light's polarization was not of the correct orientation for it to undergo further downstream processing by the display. Re-reflection by the backlight assembly reflective polarizer preferably changes the re-reflected light's polarization, providing the re-reflected light another opportunity to be transmitted through the reflective implementation of polarizer 242 and utilized in production of a desired image. Any backlight assembly reflective polarizer on the right (downstream) face of backlight 110 should transmit the light emitted by backlight 110 so that the light may propagate toward panel 240.

In the case of a constant backlight, backlight 110 produces an initial light 218 which is constant or uniform. In other embodiments, the initial light 218 may be modulated (e.g., it may be spatially modulated light, pre-modulated light, globally dimmed light, individual RGB dimmed, temporally modulated light, or a combination of these types of light). The light 218 illuminates panel 240. It should be noted that additional optical elements may be placed at virtually any point in the light/image chain of a dual LCD panel display (e.g., the FIG. 1 display), including any of diffusers, collimators, DEV, Brightness Enhancement Films (BEFs), and reflectors (for example, between backlight 110 and panel 240) depending on the display design.

The FIG. 1 display can be modified in accordance with an embodiment of the invention to include a cross BEF collimator, a reflective polarizer (e.g., a DBEF-D film), an analyzing polarizer on the downstream face of panel 240, and a holographic diffuser between panels 240 and 250. It should be recognized that the color LCD panel of FIG. 1 is an example of an image-generating panel (and is replaced by an image-generating panel that is not a color LCD panel in some embodiments), and that the achromatic LCD panel of FIG. 1 is an example of a contrast-enhancing panel and is replaced by a contrast-enhancing panel that is not an achromatic LCD panel in some embodiments.

Figure 2:
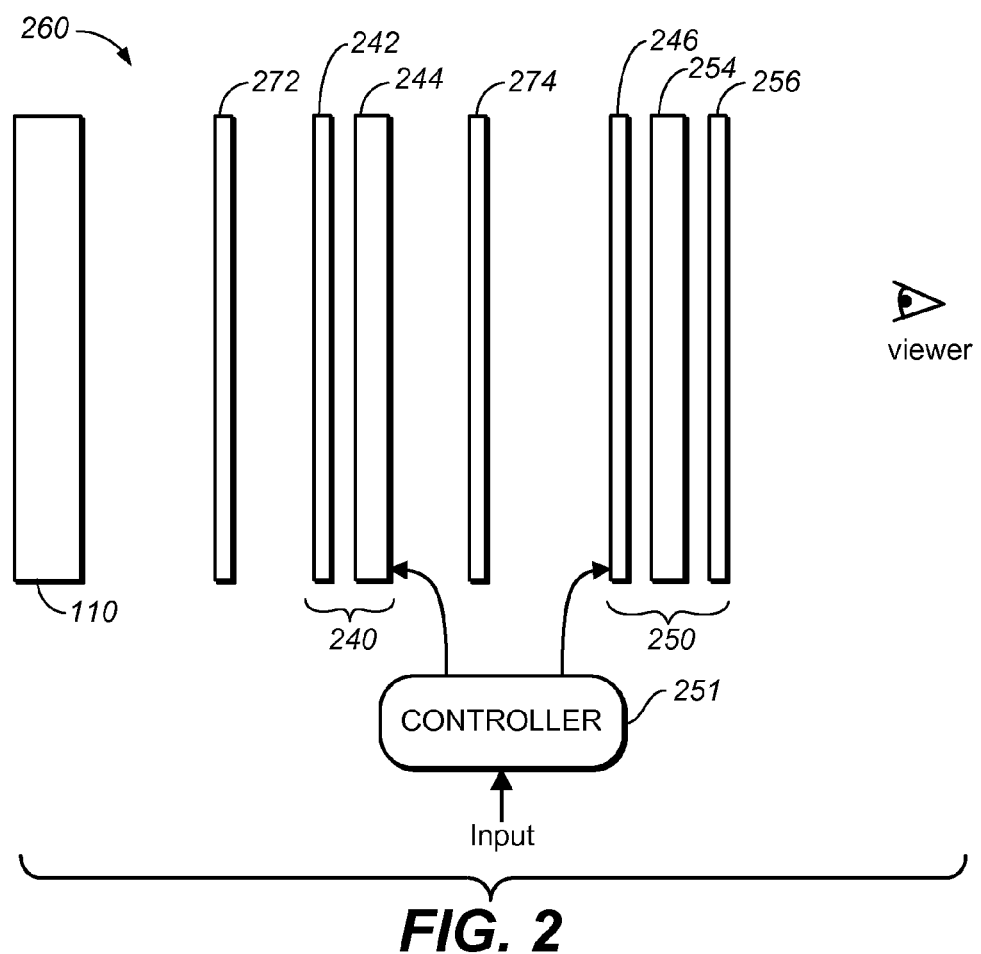
FIG. 2 is a schematic diagram of another dual LCD panel display that can be modified in accordance with an embodiment of the present invention.

FIG. 2 is a schematic diagram of high dynamic range dual LCD panel display 260. The display 260 can have better performance than the FIG. 1 display by virtue of including appropriately designed diffusers: an upstream diffuser 272 and a mid-stream diffuser 274. All elements of FIG. 2 other than diffusers 272 and 274 are identical to the identically numbered elements of FIG. 1, and the description thereof will not be repeated with reference to FIG. 2. Upstream diffuser 272 is a "rough" diffuser that is designed to diffuse the backlight into an evenly distributed light source. In the case of locally dimmed backlight (from an array of independently controllable backlight elements), upstream diffuser 272 (which may be a diffuser stack) is designed to cause the backlight to smoothly vary across pixels of achromatic panel 240.

Figure 2A:
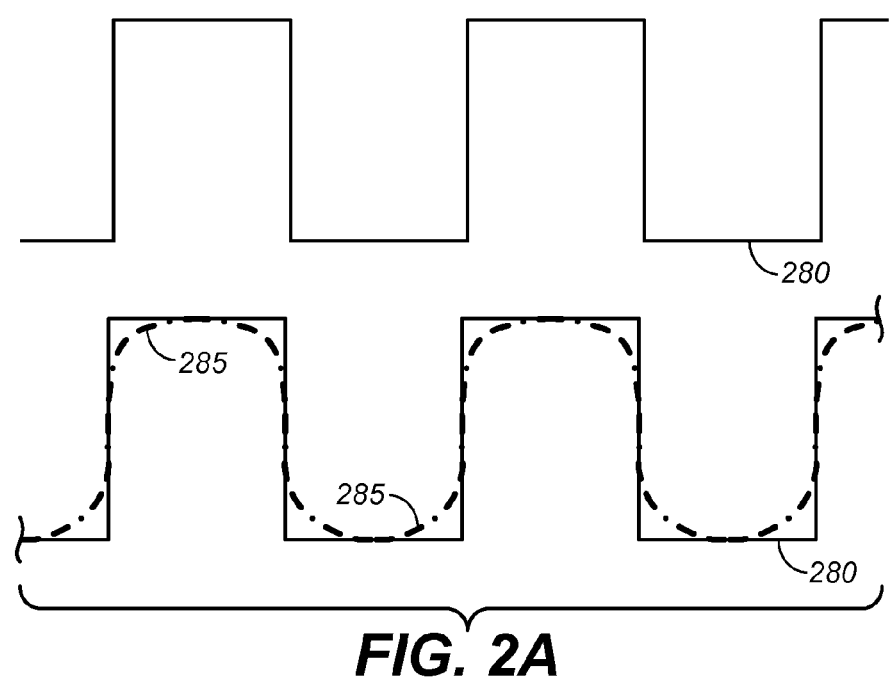
FIG. 2A is a graph illustrating high frequency features and diffusion of light transmitted in a dual LCD panel display.

Midstream diffuser 274 (between panels 240 and 250) is specifically designed to smooth light emitted from achromatic panel 240. Preferably, midstream diffuser 274 removes and smooths rough edges of the light pattern emitted from the pixels of panel 240. To do so, midstream diffuser 274 may have higher diffusion resolution (e.g., be capable of diffusing smaller features) than upstream diffuser 272 and may be capable of maintaining the modulated resolution of light emitted from panel 240. For example, the graphs set forth in FIG. 2A illustrate an "on-off" pattern of modulated light 280 intensity (versus spatial position along the face of panel 240) as might be emitted from achromatic panel 240. Midstream diffuser 274 may operate to remove sharp edges of (and smooth) the emitted light pattern 280 while preferably maintaining as much peak brightness and darkness as possible (e.g., to produce diffused light having the diffused light pattern 285 shown in FIG. 2A).

The pattern of the diffused light transmitted from diffuser 274 to panel 250 has its sharp edges (e.g. higher frequencies) removed, and the diffusing is preferably sufficient to "break-up" or prevent the formation of moiré patterns that typically develop as artifacts in displays with various combinations of grid like panels and/or other optical elements. Diffused light 285 transmitted from mid-stream diffuser 274 is preferably at an entirely different level of diffusion compared to the diffused light transmitted from upstream diffuser 272. The upstream diffuser may, for example, cause the diffused backlight to vary smoothly from the position of one lighting element in the backlight to the next. In contrast, the mid-stream diffuser may, for example, provide smooth variances of lighting over each range of positions corresponding to the dimension of a single pixel of panel 240, and mix light only from directly adjacent pixels of panel 240. In one embodiment, the upstream and mid-stream diffusers differ in diffusion coarseness by, for example, an order of magnitude or more. In fact, best results may occur with an even much greater differential in resolution between the upstream and midstream diffusers.

In one implementation of FIG. 2, upstream diffuser 272 mixes and smoothes light from multiple light sources in the backlight while midstream diffuser 274 smoothes light from single pixels of achromatic panel 240. In another implementation, upstream diffuser 272 may be described as mixing light such that a single pixel of upstream diffuser 272 is illuminated by a plurality of light sources in the backlight, and mid-stream diffuser 274 may be described as mixing light from achromatic panel 240 on a sub-pixel level (light from individual pixels of the achromatic panel, which are sometimes referred to herein as "sub-pixels" as explained below). In one embodiment, upstream diffuser 272 is a rough diffuser and mid-stream diffuser 274 is a relatively fine diffuser. In one embodiment, the mid-stream diffuser provides diffusion at less than a sub-pixel resolution. In another embodiment, the mid-stream diffuser comprises a diffuser with a spatial transfer function that either cuts-off, removes, repositions, or eliminates high frequency elements of light that would otherwise be emitted. In another embodiment, the mid-stream diffuser comprises material that diffuses light more in one direction than in another to compensate for non-squareness of the upstream pixels.

In another embodiment, mid-stream diffuser 274 preserves enough detail such that the resolution of the modulated light is not altered (e.g., resolution not altered, but higher frequency details are no longer present). The mid-stream diffuser may be designed to mask high frequency details in the light modulated by the achromatic panel. For example, the mid-stream diffuser may comprise an optical low-pass filter that passes the lowest four harmonics (e.g., in FIG. 2A, the four lowest harmonics of image 280 approximately reproduce image 285), or another set of lowest harmonics (e.g., the lowest 2, 3, 5, 6, 7, or 8 harmonics of the fundamental frequency). The mid-stream diffuser removes, for example, sub-pixel level features placed into the light stream by the achromatic panel. In most embodiments, the size of a pixel in the achromatic panel is smaller than the distance between the achromatic panel and the image-generating panel.

The coarseness of the mid-stream diffuser may, for example, be determined in part by a geometry of cells and surrounding areas of the achromatic panel. For example, if the achromatic panel comprises cells that are square with equivalent amounts of hardware (wires, cell walls, etc) on all sizes, then the coarseness of the midstream diffuser would generally be uniform in all directions. If the cells of the achromatic panel are rectangular then the coarseness of the midstream diffuser, assuming all other factors being equal, would be coarser in the direction corresponding to the longer side of the rectangle and finer in the direction corresponding to the shorter side of the rectangle.

The coarseness of mid-stream diffuser 274 may also be determined, for example, by a scale and/or physical or other uncontrolled features and/or imperfections in the cells of achromatic panel 240. The coarseness may be determined at a resolution that masks the uncontrollable features but still allows the resolution of the panel (in the form of modulated light) to pass mostly unaltered. For example, space between the cells of the achromatic panel may block light or pass some amount of unmodulated light. Blocked light or unmodulated light passed by the achromatic panel results in an uncontrolled or uncontrollable in the image being formed, which may be masked by diffuser 274

Other uncontrollable features may include, for example, differences in modulation in an achromatic panel cell not attributable to its energization level and/or non-uniformity within a cell—any of which may be due to, for example, manufacturing or component quality variances. In one embodiment, the coarseness of the mid-stream modulator is selected so that one or more of the uncontrollable features are at least one of removed, masked, or otherwise minimized through diffusion. In one embodiment, the uncontrollable features are different depending on direction (e.g., horizontal and vertical), each direction (at least two directions in a single diffuser) having different diffusion properties related to the different amounts of uncontrollable features found in those directions.

In the embodiments of FIGS. 1 and 2, polarizer 246 is used as both an analyzer for panel 240 and an initial orientation polarizer for downstream panel 250. Mid-stream diffuser 274 may be specially constructed to include polarization or to maintain existing polarization. In the case where mid-stream diffuser 274 maintains polarization (e.g., it does not substantially alter the polarization of light being diffused), then polarizer 246 operates as both the analyzer and initial orientation polarizer as described above. However, diffusers typically will impart more polarization alteration than is desirable and therefore the addition of a polarizer to diffusion element 274 may be desirable so that the light may be analyzed prior to diffusion and accompanying polarization changes. This additional polarizer could increase contrast at the expense of brightness.

The embodiments of FIGS. 1 and 2 are typically constructed so that the modulators (achromatic panel 240 and image-generating panel 250) are in close proximity to each other, which, as one benefit, reduces parallax caused by a separation between the panels. The modulators may be sandwiched together either directly or separated by thin films, air gaps, or optical stack items such as diffusers, collimators or other optical elements that are relatively thin compared to glass and other layers of an LCD panel. Even with the close proximity of the panels, parallax may occur, particularly when difficult images or patterns are displayed and viewed at off-normal angles.

The FIG. 2 display can be modified in accordance with an embodiment of the invention to include a cross BEF collimator, a reflective polarizer (e.g., a DBEF-D film), an analyzing polarizer on the downstream face of panel 240, and a holographic implementation of diffuser 274. It should be recognized that the color LCD panel of FIG. 2 is an example of an image-generating panel (and is replaced by an image-generating panel that is not a color LCD panel in some embodiments), and that the achromatic LCD panel of FIG. 2 is an example of a contrast-enhancing panel and is replaced by a contrast-enhancing panel that is not an achromatic LCD panel in some embodiments.

Figure 3A:
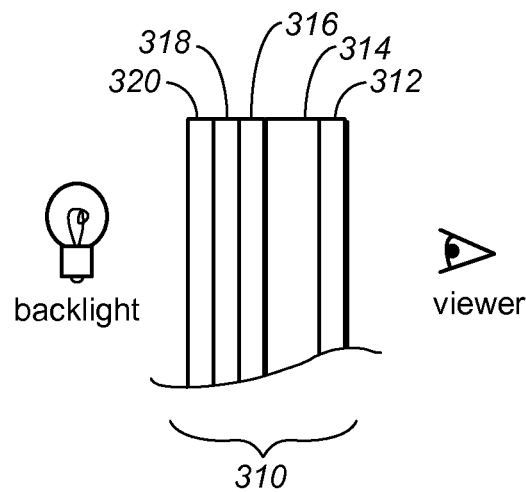
FIG. 3A is a drawing illustrating an arrangement of layers in a typical LCD panel.

Construction of a typical conventional LCD panel 310 is illustrated in FIG. 3A. A first layer from the viewing side is a polarizing (analyzing) layer 312. Next, a relatively thick transparent substrate 314 (e.g., glass) is shown. Etched on the non-viewing side of the glass are, for example, wires and/or electronics for controlling a liquid crystal layer 316. Laminated together with the substrate and liquid crystal layer(s) is a color filter layer 318 and an initial polarizing layer 320. In operation, a backlight illuminates the panel 310, polarizing layer 320 sets an initial polarization, color filters 318 provide the primary colors Red, Green, and Blue, and liquid crystal layer 316 rotates polarization of each R, G, and B light by an amount that each light is to be attenuated. The analyzing layer then absorbs amounts of the R, G, and B lights based on their respective polarizations as imparted by the liquid crystal layer.

Figure 3B:
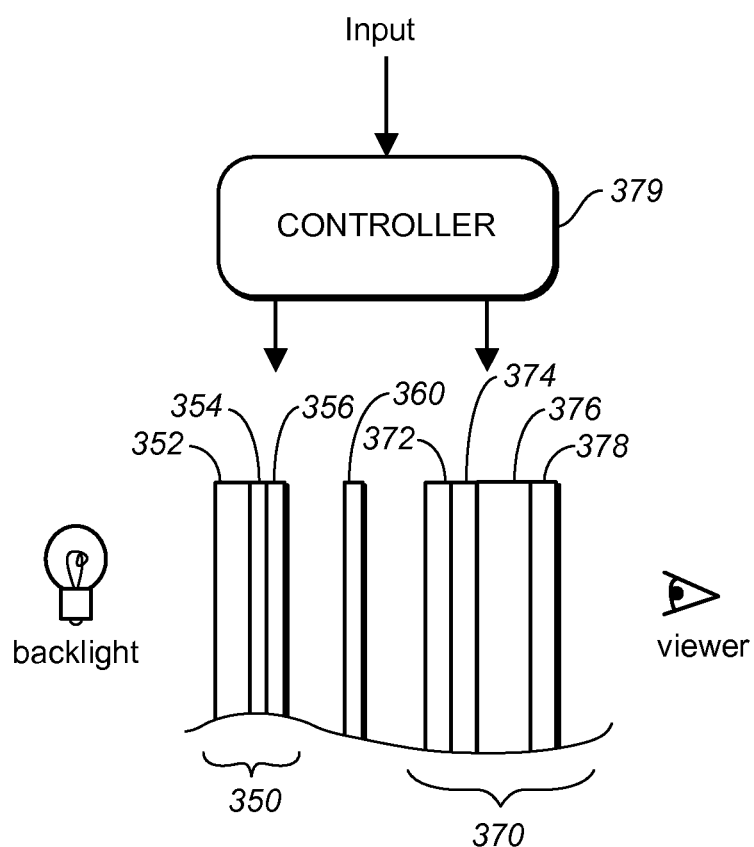
FIG. 3B is a diagram of a portion of a dual LCD panel display, including an achromatic LCD panel, a color LCD panel, and a controller, showing an arrangement of layers in each of the LCD panels.

FIG. 3B is a diagram of a portion of a dual LCD panel display, including achromatic LCD panel 350, color LCD panel 370, and controller 379, showing an arrangement of layers in each of the LCD panels. The arrangement is specifically designed to place the active layer of achromatic LCD panel 350 as close as possible to the active layer of the color LCD panel 370. The layers of achromatic panel 350 (from the backlight side) comprise a transparent substrate 352, an initial polarization layer 354, and an active layer 356 (e.g., controllable polarizing layer). A polarizer 360 (which may be a separate component or laminated together with either achromatic panel 350 or color LCD panel 370) performs double duty as both an analyzing polarizer for the achromatic panel 350 and an initial polarizing layer for color LCD panel 370.

Continuing from the backlight side, the layers of color LCD panel 370 comprise color filter layer 372, active layer 374, substrate 376, and polarization (analyzing) layer 378. Other arrangements of the layers may be utilized, including, for example, placing the polarization (analyzing) layer 378 on the backlight side of the substrate 376. The polarization (analyzing) layer 378 may also be placed on the backlight side of the color filter layer 372 and the active layer 374 may be placed as the first layer on the backlight side of panel 370 (e.g., active layer—color filter layer—polarization (analyzing layer). Controller 379 asserts drive signals to the active elements of panels 350 and 370 in response to input image data (e.g., input video).

The FIG. 3B display can be modified in accordance with an embodiment of the invention to include a cross BEF collimator, a reflective polarizer (e.g., a DBEF-D film), an analyzing polarizer on the downstream face of achromatic panel 350 and a separate polarizing layer on the upstream face of color LCD panel 370 (in place of shared polarizer 360), and a holographic diffuser between panels 350 and 370.

In some embodiments of the present invention, an achromatic panel and an image-generating panel are provided from similarly constructed LCD panels. The achromatic panel may, for example, be oriented backwards or upside down (flipped or inverted) relative to the LCD panel. This arrangement places the active layers of the achromatic panel and the image-generating panel closer together than would be in the case of similarly oriented panels of typical commercially available construction.

Figure 4A:
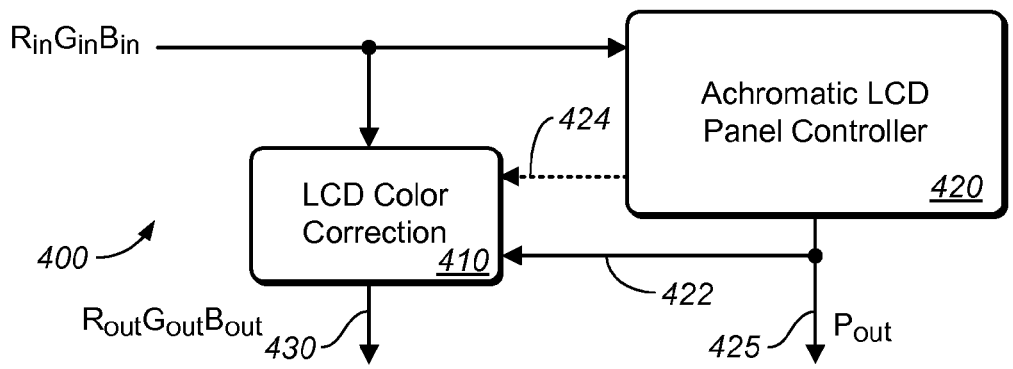
FIG. 4A is a block diagram of a controller for a dual LCD panel display, showing an architecture of the controller (an electronic device) that could be included in an embodiment of the present invention to generate drive signals for the display's color LCD panel and achromatic LCD panel.

FIG. 4A is a block diagram of a controller for a dual LCD panel display, showing an architecture of the controller (an electronic device) that generates drive signals for the display's color LCD panel and achromatic LCD panel (e.g., with module 410 implemented in a manner to be described with reference to FIGS. 5 and 5A). The achromatic LCD panel is physically located upstream of the color LCD panel in typical embodiments of the display, but is located downstream of the color LCD panel in other embodiments of the display (drive signals for the panels can be generated regardless of the relative positions of the LCD panels). Controller 400 is an electronic system or device (e.g., electronic circuitry, software architecture, programmable device architecture, plug-in, etc., or combinations thereof) that generates drive signals for a color LCD panel and an achromatic LCD panel. An input signal (indicative of $R_{in}$, $G_{in}$, and $B_{in}$ values) is provided and/or extracted from an image or video source (e.g., DVD, Cable, Broadcast, Satellite, Streaming video, Internet, removable media, thumb drive, etc.) to color LCD panel control module 410 and achromatic panel control module 420. The achromatic panel control module generates a signal $P_{out}$ (identified by reference number 425) that is asserted to an achromatic LCD panel (which is typically located upstream of a corresponding color LCD panel in a dual LCD panel display). In essence, the $P_{out}$ signal 425 indicates which pixels of the achromatic panel should be attenuated and the amount of attenuation (e.g., implemented by rotating the polarization of pixels to be attenuated by an amount proportional to the amount of desired attenuation for that pixel). The $P_{out}$ signal 425 may be, for example, a luminance value derived from the $R_{in}G_{in}B_{in}$ data.

Processing in color panel control module 410 may implement, for example, both a characterization and correction that produces a corrected response curve (e.g., correcting the input RGB values in response to a given luminance thereof) and a non-linear transfer function that increases or decreases local contrast (makes pixels of the color LCD panel darker or lighter). Processing in achromatic panel control module 420 may implement a correction that applies a transfer function (e.g., a non-linear transfer function) to luminance values determined from the input RGB values to increase or decrease local contrast (makes pixels of the achromatic LCD panel darker or lighter). The non-linear function may, for example, brighten or darken pixels in a manner that takes into account the relative brightness of neighboring pixels. As shown, $P_{out}$ is asserted to color panel control module 410, so that the output of module 410 is determined by both the input $R_{in}G_{in}B_{in}$ data and each achromatic panel drive value determined by the $P_{out}$ signal. Alternatively, intermediate data 424 (generated in module 420) may be exclusively or additionally forwarded to color panel control module 410. Intermediate data 424, may be, for example, partially processed data generated by performing one or more of the steps performed to produce $P_{out}$ (e.g., characterization without applying the non-linear function). In response to the $R_{in}G_{in}B_{in}$ data, color panel control module 410 generates an $R_{out}G_{out}B_{out}$ drive signal 430 that is asserted to a color LCD panel of the display (e.g., a 1920×1080 pixel panel) to drive the pixels of the color LCD panel.

Figure 4B:
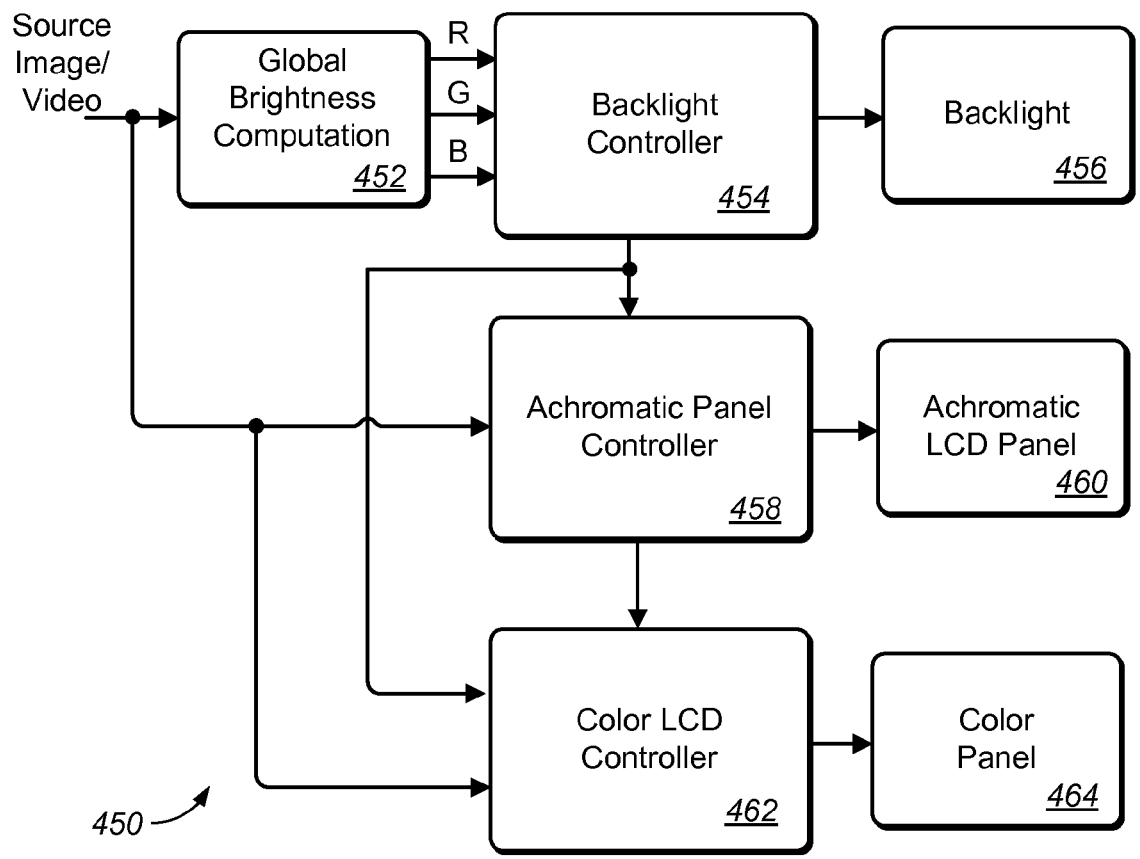
FIG. 4B is a block diagram of a dual LCD panel display, showing an architecture of a controller (an electronic device) that could be included in an embodiment of the present invention to generate drive signals for the display's color LCD panel and achromatic LCD panel.

FIG. 4B is a block diagram of a dual LCD panel display, showing an architecture of controller 450 (e.g., electronic circuitry, software architecture, programmable device architecture, plug-in, etc., or combinations thereof) that generates drive signals for the display's color LCD panel 460 (e.g., with module 462 implemented in a manner to be described with reference to FIGS. 5 and 5A). Controller 450 is implemented as an electronic device 450 (e.g., a programmed processor) that generates drive signals for backlight 456, achromatic LCD panel 460, and color LCD panel 464. A source image/video signal indicative of $R_{in}G_{in}B_{in}$ input pixel values is provided and/or extracted from an image or video source (e.g., DVD, Cable, Broadcast, Satellite, Streaming video, Internet, removable media, thumb drive, etc.) to global brightness computation module 452, which separates the light into R, G, and B primary color components and provides these components to backlight controller 454. In response, controller 454 generates a backlight control signal for driving backlight unit 456. The backlight control signal may determine a backlight drive value for each primary color component of each pixel of a backlight array, or a single backlight drive value for a backlight.

In one embodiment, in the case of a locally dimmable implementation of backlight unit 456 (e.g., a backlight that includes locally dimmed (or dimmable) light sources), the backlight unit 456 may generate a spatially modulated backlight that illuminates downstream achromatic and color LCD panels 460 and 464 according to relative brightness in areas of each input image. The relative brightness may be computed, for example, based on the relative intensities of each primary color in a corresponding backlight pixel. Production of the spatially modulated backlight may also include, for example, consideration of the brightness of neighboring or nearby backlight pixels, and/or, in the case of video, brightness of pixels in preceding and/or subsequent image frames.

Achromatic LCD panel controller 458 receives the input video/image signal and optionally also the backlight control signal, and generates an achromatic panel control (drive) signal in response thereto. The achromatic panel control signal specifies an amount of dimming produced by each pixel of achromatic panel 460. Achromatic panel 460 may be of higher (or lower, or equal) resolution than color LCD panel 464.

In one embodiment, image-generating (color LCD) panel 464 is downstream from achromatic panel 460 and the latter panel (typically of higher resolution than is panel 464) is utilized to produce an illumination profile that is intentionally blurred (blurred using the higher resolution capabilities of the achromatic panel as opposed to blurred because the achromatic panel is of lower resolution). The intentionally blurred image is blurred using the higher resolution capabilities of the display separate and apart from any blurring that occurs among or due to mixing of the backlights due to point spread functions or other qualities/orientations of the backlight or individual lights in the backlight. Although the aforementioned blurring is separate and apart from backlight blurring or mixing, embodiments of the invention may nonetheless include amounts of mixing or blurring of individual elements of the backlight.

Color LCD panel controller 462 receives the achromatic panel control signal, the image/video signal, and optionally also the backlight control signal, and generates a color LCD panel control signal (for driving each pixel of color LCD panel 464) in response thereto.

Figure 4C:
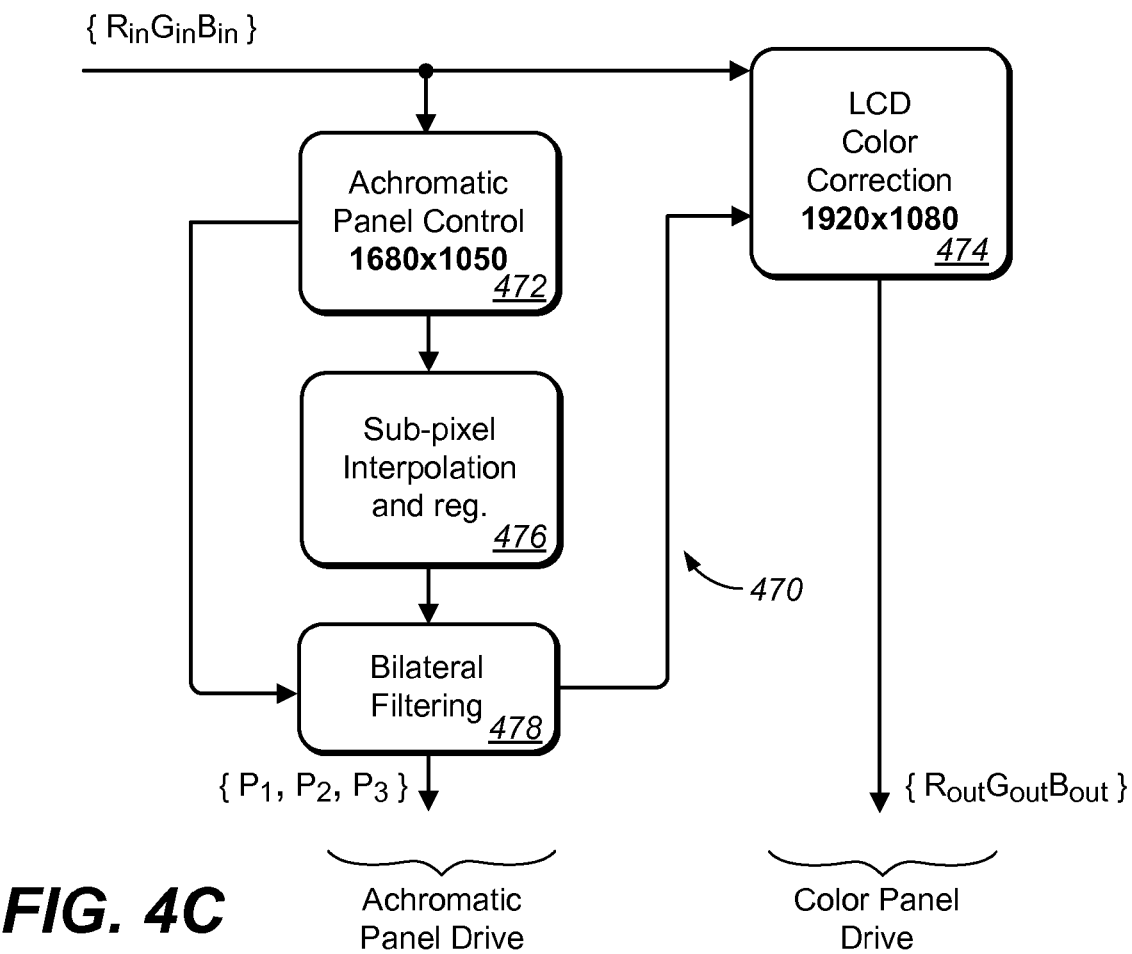
FIG. 4C is a block diagram of a controller for a dual LCD panel display, showing an architecture of the controller (an electronic device) that could be included in an embodiment of the present invention to generate drive signals for the display's color LCD panel and achromatic LCD panel.

FIG. 4C is a block diagram of a controller (470) for a dual LCD panel display, showing an architecture of the controller (an electronic device) that generates drive signals for the display's color LCD panel and achromatic LCD panel (e.g., with module 474 implemented in a manner to be described with reference to FIGS. 5 and 5A), in response to an input signal (a sequence of input values $R_{in}$, $G_{in}$, and $B_{in}$) provided to achromatic panel control module 472 and LCD color correction module 474. LCD color correction module 474 may be configured to correct and produce an output (color LCD panel drive values $R_{out}$, $G_{out}$, and $B_{out}$) for driving an 1920× 1080 LCD array of RGB pixels. Achromatic panel control module 472 (with modules 476 and 478) may be configured to generate drive values for controlling an achromatic LCD panel having a lower resolution, for example, an 1680×1050 LCD array. Achromatic panel control module 472 (with modules 476 and 478) may be configured to generate drive values for controlling an achromatic LCD panel having 1920×1080 pixel resolution.

Achromatic panel control module 472 outputs a set of drive values P1', P2', and P3' (useful for driving the three LCD cells of a pixel of an achromatic LCD panel having the same resolution as the color LCD panel) in response to each trio of input values Rin, Gin, and Bin, and asserts them to each of sub-pixel Interpolation and Registration module 476 and filtering module 478. Since the actual achromatic LCD panel typically has higher resolution than the color LCD panel, module 476 performs interpolation on the values P1', P2', and P3', to generate a set of interpolated drive values for each pixel of the achromatic LCD panel (each pixel of the achromatic panel, driven by a set of three of the interpolated drive values, will be referred to as a "sub-pixel" since it is smaller than the larger pixels of the color LCD panel). Operation of interpolation and registration module 476 preferably allows the controller to drive different achromatic panels with different control resolutions and sizes. Filter module 478 performs spatial and range filtering on the interpolated drive values (from module 476) to smooth the monochromatic image produced by the driven achromatic panel, to achieve better viewing angle performance while maintaining edges and preserving the high frequency details in the image, and to enhance local contrast. The filtering in module 478 may diffuse the drive to the achromatic LCD panel to improve off-angle viewing.

The output of module 478 is a sequence of sets of achromatic panel drive values P1, P2, and P3 (each set of values P1, P2, and P3 generated in response to a set of three interpolated drive values from module 476) for driving the three cells of each pixel of the achromatic panel. The achromatic panel drive values P1, P2, and P3 are also asserted to module 474 for generation of color LCD panel drive values $R_{out}$, $G_{out}$, and $B_{out}$ in response thereto.

The color LCD panel control signal output from module 474 is a sequence of sets of color panel drive values $R_{out}$, $G_{out}$, and $B_{out}$ (each set of values $R_{out}$, $G_{out}$, and $B_{out}$ generated in response to a set of three input values $R_H$, $G_{in}$, and $B_{in}$) for driving the cells of each pixel of the color LCD panel.

Figure 4D:
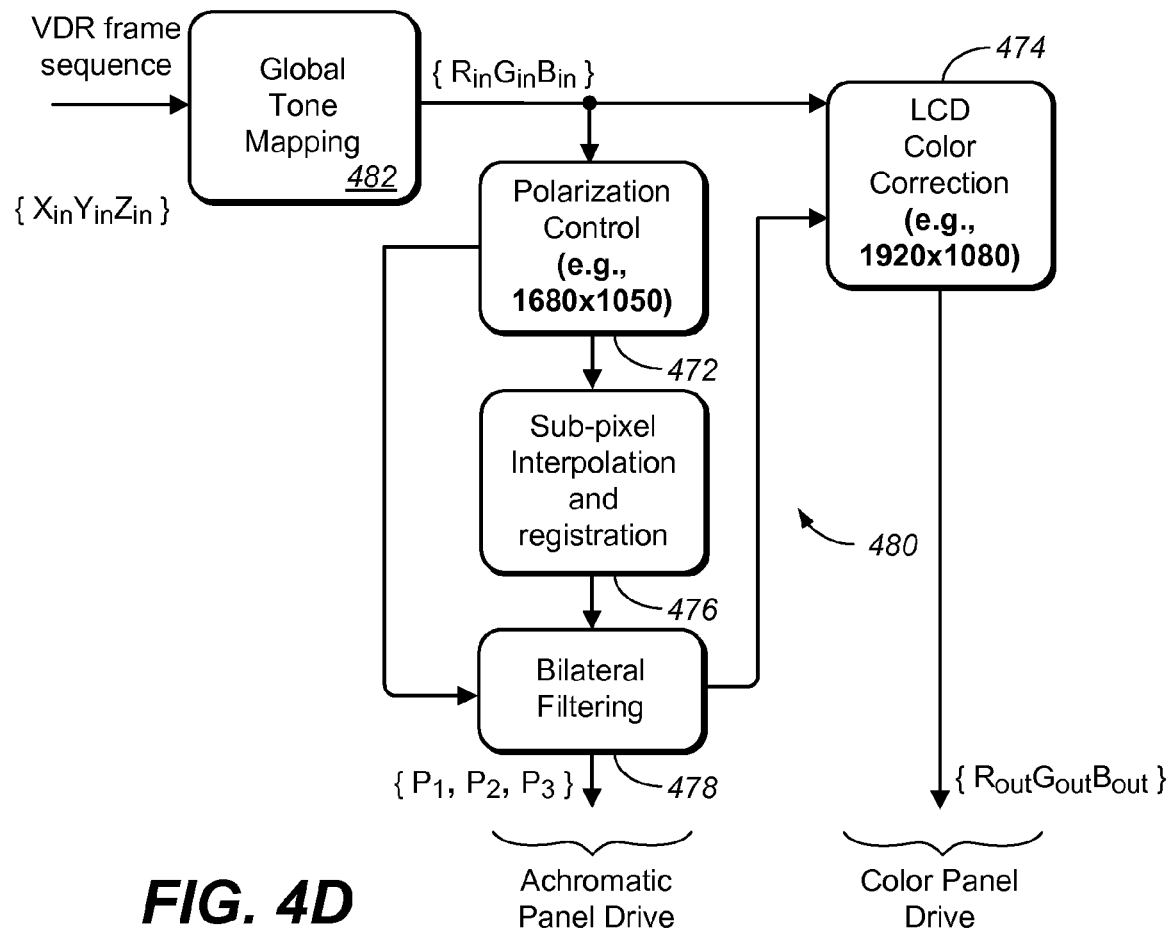
FIG. 4D is a block diagram of a dual LCD panel display, showing an architecture of a controller (an electronic device) that could be included in an embodiment of the present invention to generate drive signals for the display's color LCD panel and achromatic LCD panel.

FIG. 4D is an architecture of another controller for generating drive signals for the achromatic LCD panel and color LCD panel of an embodiment of the inventive display, in response to an input signal (a sequence of input values $R_{in}$, $G_{in}$, and $B_{in}$) provided to the achromatic panel control module and LCD color correction module of FIG. 4D. The architecture of FIG. 4D is identical to that of FIG. 4C, except as described below. The description of aspects of FIG. 4C that are identical to corresponding aspects of FIG. 4D will not be repeated with reference to FIG. 4D.

The FIG. 4D architecture provides a framework for utilization of a High Dynamic Range (HDR) input signal, e.g., an HDR signal indicative of an image or images (e.g., video) having a dynamic range that is equivalent to the dynamic range of the human visual system (HVS) on average. Since, on average, the HVS has greater dynamic range than most displays, a tone mapping algorithm (implemented by Global Tone Mapping Module 482 of FIG. 4D) is applied to change the dynamic range of the image(s) indicated by the input signal so that they are within luminance range of the display system. An HDR frame sequence, each pixel of which is defined by a trio of values $\{X_{in}Y_{in}Z_{in}\}$, is provided to Global Tone Mapping Module 482 of FIG. 4D. Module 482 transforms each trio of $X_{in}Y_{in}Z_{in}$ values into RGB values in a RGB color space, and asserts the resulting RGB signal to the achromatic panel control module and LCD color correction module of FIG. 4D (which are identical to the corresponding achromatic panel control module 472 and LCD color correction module 474 of FIG. 4C. In response to this RGB signal, the elements of the FIG. 4D system (other than module 482) operate as does the FIG. 4C system.

We next describe additional details of methods for driving the achromatic LCD panel and image-generating (color) LCD panel of embodiments of the inventive display. The display architecture including an achromatic LCD panel and a color LCD panel (e.g., of similar construction) allows performance of local dimming in a sub-pixel (or higher resolution) fashion. One of the modulators can have a different or identical resolution than the other in either dimension.

Pixels of the achromatic LCD panel can be driven based on the luminance of a corresponding (or related) input pixel. Accurate characterization of the achromatic LCD panel's output luminance response can be used to map input RGB pixel values to specific drive levels.

Drive values for the achromatic panel in response to a set of input image values $R_{in}$, $G_{in}$, and $B_{in}$ may be generated in accordance with a function of the luminance response of the combined dual panel system in response to linear variation of the achromatic panel's control with the color LCD panel drive set to full white (maximum drive signal codewords) and a nonlinear transfer function representing the skew of the codewords with the luminance representing the nonlinear nature of the drive. This function could be used to improve the local contrast of the display using a nonlinear input-output relationship making dark regions darker and bright regions brighter. The drive computation can be used to calculate the drive for each of the pixels of the achromatic panel, or for each of the cells of each pixel of the achromatic panel. Each pixel of the achromatic LCD panel may comprise three cells, driven by the same or different achromatic panel drive values, e.g., in the case that the achromatic LCD panel has a similar construction and orientation to the color LCD panel except that the cells of the achromatic LCD panel are not color-filtered as are the cells of each pixel of the color LCD panel.

The interaction between the image-generating (color LCD) panel and the achromatic panel can be represented as a color correction function. This function may be determined by characterization of (i.e., measuring) the color primaries of the image-generating panel when illuminated by light from the achromatic panel in response to a set of achromatic panel drive values (generated in response to a set of input color values), and determining a correction function to achieve a desired color (rather than the actually measured color) in response to the set of input color values. The color LCD panel can then be driven by the corrected drive values (determined in response to a set of input color values, e.g., using a look-up table) while the achromatic panel is driven by a set of achromatic panel drive values (generated in response to the same set of input color values, e.g., using another look-up table), to cause display of desired color (by the dual LCD panel display) in response to the input color values.

The resulting RGB drive for the color LCD panel may be, for example, of the following form (where $R_{out}$, $G_{out}$, and $B_{out}$ are drive values for the three cells of one pixel of the color LCD panel):

$R_{out} = f_3(R_{in}, f_4(R_{in}, Y_{out}))$, and $G_{out} = f_5(G_{in}, f_6(G_{in}, Y_{out}))$, and $B_{out} = f_7(B_{in}, f_8(B_{in}, Y_{out}))$, where $f_4$, $f_6$ and $f_8$ are characterization functions each defining an output primary for a set of input pixel values and a computed $Y_{out}$ value (where $Y_{out}$ is a luminance determined from the set of input primary pixel values), and each of $f_3$, $f_5$ and $f_7$ is a nonlinear combination function of an input primary and the output primary determined by one of the characterization functions.

Sub-pixel control of the achromatic LCD panel (e.g., where the pixels of the achromatic LCD panel, referred to as "sub-pixels," are smaller than pixels of the color LCD panel) can be used to smooth out any parallax errors that are incurred by use of the achromatic LCD panel. Since sub-pixel control increases the effective resolution of the achromatic panel, it can cause smoothing/dithering operations to be more refined and accurate. This can be implemented using a smoothing mask on the drive image to the achromatic panel, such as, for example:

[smoothed drive$_{achromatic\ panel}]_{(i,j)} = f_{int\ R}([\text{drive}_{achromatic\ panel}]_{(i,j)})$ where $f_{int\ R}$ is a smoothing operator applied on a spatial radius of R sub-pixels of the achromatic panel. In a construction with four pixels (referred to as sub-pixels) of the achromatic panel corresponding to every pixel on the color LCD panel, the applied quad design would increase the resolution of the achromatic panel to twice that of the image-generating (color LCD) panel along both the width and the height directions.

In an embodiment, a source image may be processed through a nonlinear function to modulate the achromatic panel. This can create a perceived effect of contrast stretching. Existing tone mapping algorithms rely exclusively on software algorithms to stretch contrast.

Some embodiments of the invention use RGB individually controlled tristimulus-based backlights (e.g., LEDs, arranged in an edge lit configuration, direct lit array, or other arrangement). By scaling the current drives to the RGB individually controlled tristimulus LED backlight, the 3D surface of the luminance versus chromaticity of colors that represented may be adjusted. Luminance control is primarily from the dimming plane and the combination of the LED backlight and the dimming plane, scaling the color drives to the LEDs allows for wider color gamut at higher luminance values. For a target display luminance, the luminance vs current characterization curves may be used to determine/create the right scaling parameters for a current drive designed for better control of color gamut at that target luminance. This forms a basis for a global backlight controller embodiment.

The global backlight controller embodiment can be used, for example, on a plurality of LEDs which are closely spaced to create an edge lit zonal dimming backlight on conjunction with the color LCD and the dimming plane. By working on a plurality of LEDs at a time, the global backlight controller embodiment can also be used for correcting drifts in the output wavelength of light from a zone with luminance and maintain more accurate color properties at higher wavelengths.

Some embodiments of the invention include computation of a color primary rotation matrix from a sparse measured data set. Given a sparse set of tristimulus primaries (R, G, B) as input images to the display system, a color rotation matrix (e.g., an optimum color rotation matrix) is determined for converting each trio of input RGB values in the sparse set to a corresponding set of drive values (XYZ) for the color LCD panel of the display. The matrix could be predetermined, then implemented as a look-up table (LUT), and then used during a display drive value operation to generate a set of drive values for the color LCD panel of a display in response to a set of input RGB values (and achromatic panel drive values determined from the input RGB values). For example, the operation of reading (from the LUT) a set of drive values for the color LCD panel in response to a set of input RGB values (and achromatic panel drive values determined therefrom) could be equivalent to multiplication (of the inputs to the LUT) by the rotation matrix.

The computed color rotation matrix could be implemented by module 474 of FIG. 4C or 4D, or by controller module 410 of FIG. 4A, or by controller module 462 of FIG. 4B, or by a LUT or processor of any of the types described in U.S. Provisional Patent Application No. 61/479,958, filed on Apr. 28, 2011, and is preferably optimized for minimum least square color distortion in the output color space given the number of sample data points that have been measured to determine the matrix. Given more uniformly spaced data points, the computed color rotation matrix would be a more accurate representation of the true rotation operation by the display.

The color rotation matrix may be determined as a result of preliminary measurements on the display in which the display is backlit (e.g., with a constant, known backlight) and driven by a sparse set of input color value trios ($R_{in}$, $G_{in}$, and $B_{in}$), and a trio of achromatic panel drive values (P1, P2, and P3) determined from each trio of input color values, and the actual color emitted by the display in response to each trio of input color values ($R_{in}$, $G_{in}$, $B_{in}$) and the corresponding set of achromatic panel drive values (P1, P2, P3) is measured and compared to a target (desired) set of colors in response to said set of input color values and corresponding achromatic panel drive value set. As a result of the measurements, the color rotation matrix can be determined to be a matrix which, when matrix-multiplied with a vector whose coefficients are an input color value trio ($R_{in}$, $G_{in}$, and $B_{in}$) and a corresponding trio of achromatic panel drive values (P1, P2, and P3), will determine corrected color LCD panel drive values ($R_{out}$, $G_{out}$, and $B_{out}$) and achromatic panel drive values (P1, P2, and P3) which will drive the display to display the target color determined by the input color value trio ($R_{in}$, $G_{in}$, and $B_{in}$).

A set of color panel drive values ($R_{out}$, $G_{out}$, and $B_{out}$) determined by the color rotation matrix in response to each of a full set of input color value trios ($R_{in}$, $G_{in}$, and $B_{in}$) and trio of achromatic panel drive values (P1, P2, and P3) determined by each input color value trio, can be stored in a color drive LUT. The color drive LUT could be implemented in module 474 of FIG. 4C or 4D, or by controller module 410 of FIG. 4A, or by controller module 462 of FIG. 4B, or by a LUT of any of the types described in U.S. Provisional Patent Application No. 61/479,958, filed on Apr. 28, 2011. To produce the color drive LUT, a sparse set of the corrected color panel drive values could be determined (from a sparse set of input image color value trios and corresponding achromatic panel drive value trios) and then interpolation could be performed thereon to generate a full set of corrected color panel drive values (e.g., including a trio of output color panel drive values, $R_{out}$, $G_{out}$, and $B_{out}$ for each possible set of input color values Rin, Gin, and Bin), and the full set could then be loaded into the color drive LUT.

In other embodiments of the inventive display, color panel drive values are generated or provided (e.g., computed on the fly by matrix multiplication) in response to the input image pixels, in a manner other than being read from a color drive LUT.

Some embodiments of the inventive display may include a controller of any of the types described in U.S. Provisional Patent Application No. 61/479,958, filed on Apr. 28, 2011, for generating drive signals for a color LCD panel and an achromatic LCD panel of the display. Such a controller would typically generate drive values for the achromatic LCD panel and color LCD panel in response to input image pixels (each input image pixel determined by a trio of color values $R_{in}$, $G_{in}$, and $B_{in}$), perform operations on a per pixel basis, and generate a single achromatic drive value for each pixel of the achromatic LCD panel, so that (where each pixel of the achromatic LCD panel comprises three cells) each cell of the achromatic LCD panel's pixel is driven by the same achromatic drive signal (P1=P2=P3=P).

Figure 5:
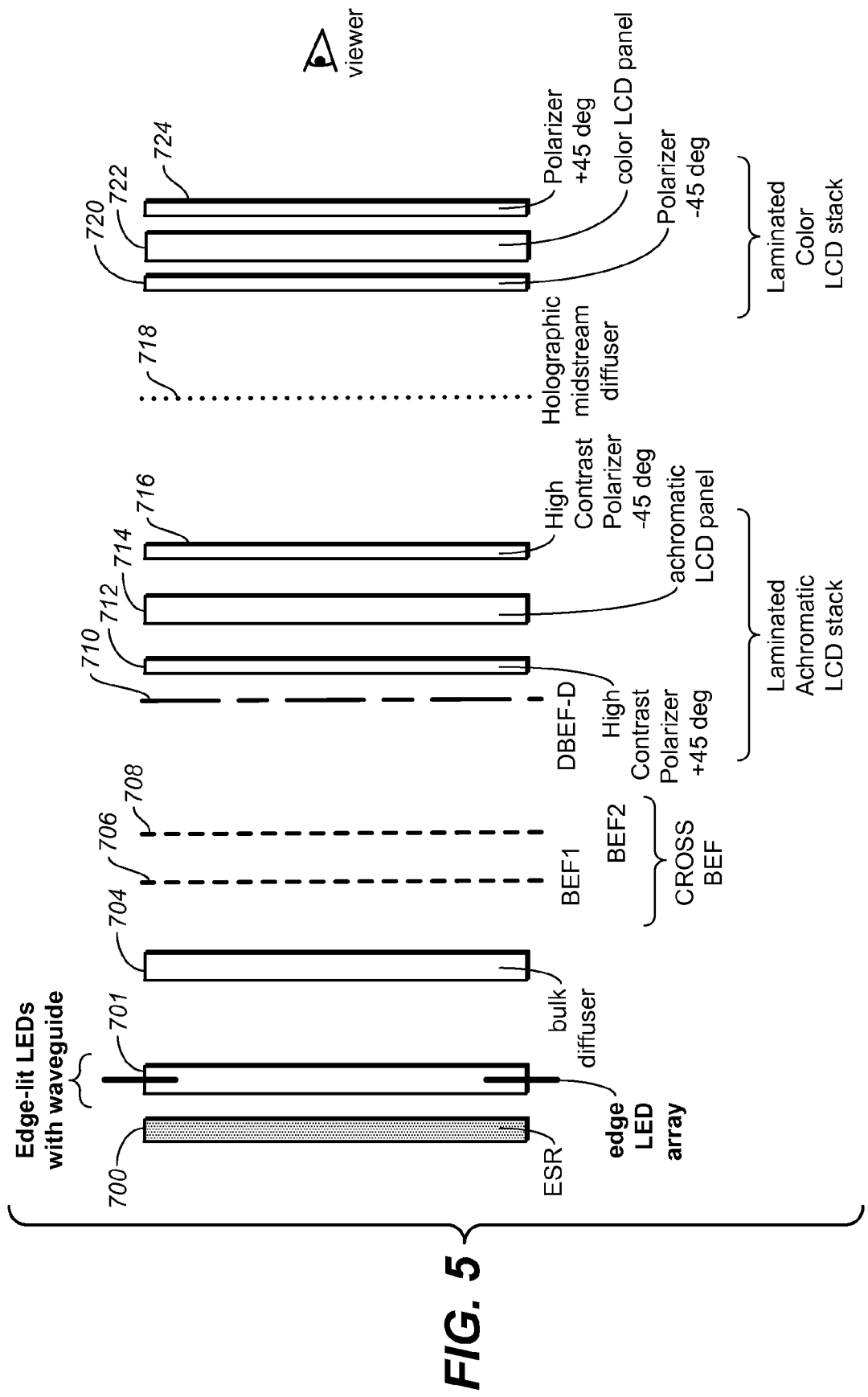
FIG. 5 is a simplified side cross-sectional view of elements of an embodiment of the inventive dual LCD panel display.
Figure 6:
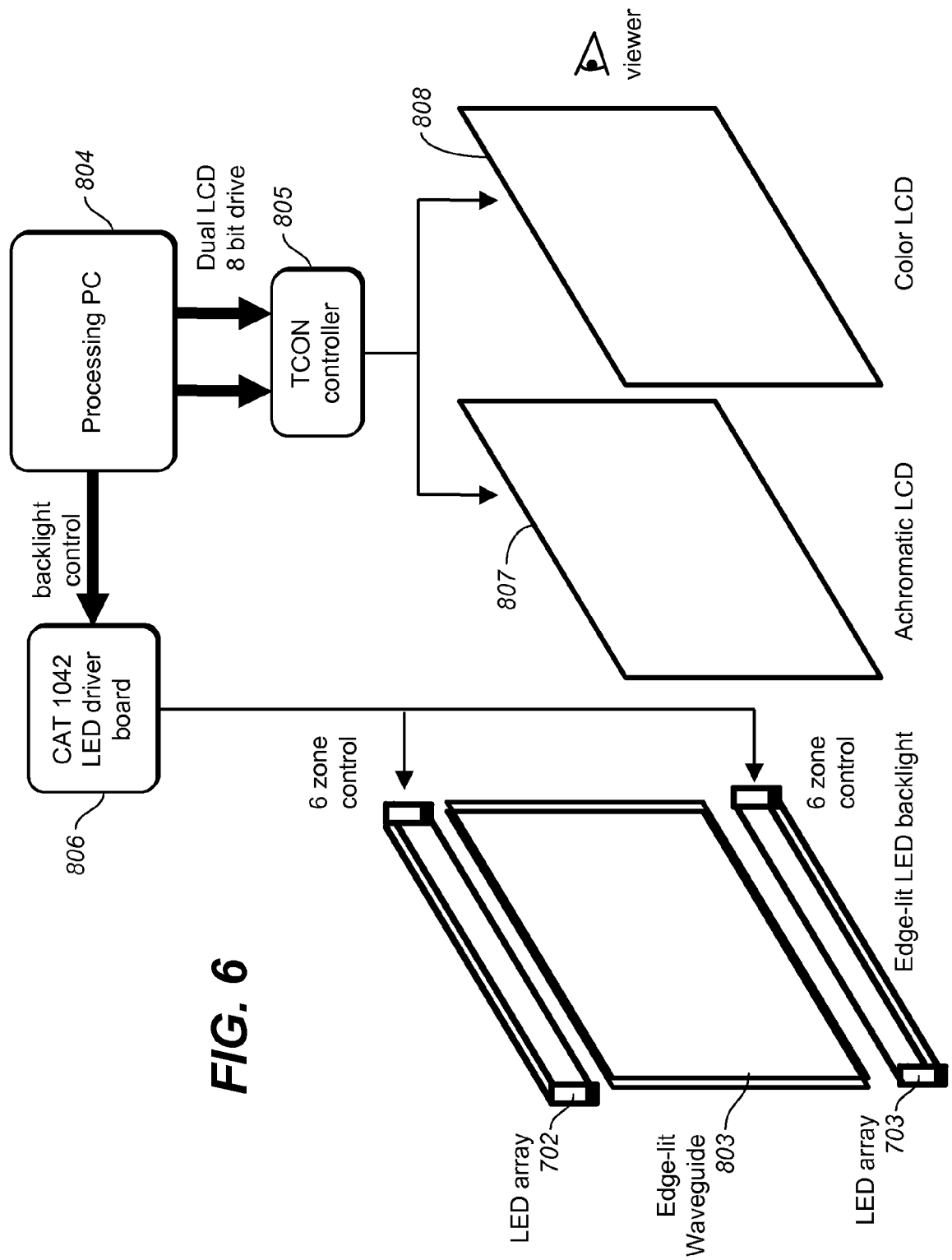
FIG. 6 is an exploded perspective view of elements of the dual LCD panel display of FIG. 6, and a block diagram of elements for controlling the backlight and LCD panels of the display.

The FIG. 5 embodiment of the inventive display includes a backlight assembly comprising a modulated backlight 701 comprising an array of individually modulated backlight sources. Preferably, backlight 701 is implemented as an array of LEDs (e.g., 192 RGB LEDs in an edge-lit configuration as shown in FIG. 6) and a controller (elements 804 and 86 of FIG. 6) for driving the LEDs. The LEDs (a top edge array 702 of ninety-two LEDs, and a bottom edge array 703 of ninety-two LEDs, as shown in FIG. 6) illuminate the edges of a waveguide (element 803 of FIG. 6) to generate a uniform flat white field at the front surface (facing the achromatic LCD panel) of backlight 701. An LED driver card (e.g., a CAT1042 LED driver card 806, in response to control values from processor 804, as shown in FIG. 6) may provide zonal control to the RGB LED primaries. When 192 RGB LEDs are controlled in gangs of sixteen, there are twelve zones of control along the top and bottom edges, allowing us to create a custom white point for the backlight and correct for color non-uniformity at the front of the screen.

Backlight 701 may be implemented as a zonal edge-lit backlight unit of the type described in U.S. patent application Ser. No. 12/882,825, filed on Sep. 15, 2010, including individually controllable LEDs arranged along edges of a display panel, and a subsystem which directs light from the LEDs to zones of pixels of the display panel. The full text and disclosure of U.S. patent application Ser. No. 12/882,825 is hereby incorporated herein by reference. Light emitted from backlight 701 functions to backlight the LCD cells of an achromatic LCD panel (panel 807 of FIG. 6 or the LCD panel comprising elements 712, 714, and 716 as shown in FIG. 5).

Reflector 700 is positioned behind (downstream from) backlight 701 to improve the efficiency of the backlight assembly by reflecting backlight emitted from backlight 701 toward the achromatic LCD panel. Reflector 700 is preferably implemented as an enhanced specular reflective film (ESR), e.g., a commercially available ESR known as the "Vikuiti™ ESR" film, available from 3M.

Bulk diffuser 704 diffuses the light from backlight 701, preferably making it a uniformly flat field. The elements shown in FIG. 5 are mounted in a housing (not shown).

Brightness enhancement film (BEF) 706 and BEF 708 are positioned between diffuser 704 and the achromatic LCD panel. BEF 706 and BEF 708 are typically identical BEFs, each having a substantially flat major surface (with a normal axis) and reflective features (e.g., ridges) arranged parallel to a first surface axis (an "X" surface axis) orthogonal to the normal axis. BEF 706 and BEF 708 are arranged with their major surfaces parallel to each other and oriented with their "X" surface axes offset with respect to each other by 90 degrees. With this relative orientation, BEFs 706 and 708 collimate light transmitted from bulk diffuser 704 in an efficient manner.

BEF 706 is preferably oriented to collimate diffused light from diffuser 704 by folding such diffused light that is incident at BEF 706 from the extreme left and right sides of the FIG. 5 display to cause the light to propagate toward BEF 708 (BEF 706 also reflects back toward backlight 701, or transmits without collimating, other diffused light that is incident thereon).

BEF 708 is preferably oriented to further collimate light from diffuser 704 by folding light that is incident at BEF 708, via BEF 706 and then from the extreme top and bottom sides of the FIG. 5 display, to cause such light to propagate at least substantially parallel to the optical axis of the display toward the achromatic LCD panel. The two BEF films 706 and 708 are collectively referred to herein as a "cross BEF" element or "cross BEF collimator."

Reflective polarizer 710 (implemented as a DBEF-D film in some embodiments) is positioned between the cross BEF element and the achromatic LCD panel. The collimated light propagating from BEF 708 toward the achromatic LCD panel is given a strong polarization bias by polarizer 710, which reflects incorrectly polarized light back toward BEFs 706 and 708. Polarizer 710 should be oriented relative to initial polarizer 712 (of the achromatic LCD panel) so that the polarization of the light transmitted by polarizer 710 match that of the light transmitted (to array 714 of the achromatic LCD panel) by polarizer 712. The cross BEF element (706,708) together with the reflective polarizer 710 create a lensing effect which collimates and polarizes light incident at the cross BEF element at obtuse angles (from backlight 701 and diffuser 704), and recycles (reflects back toward diffuser 704) light that is incident at the cross BEF element at other (non-obtuse angles) in order to improve the overall efficiency of the optical stack.

We have observed that inclusion of a cross BEF collimator (e.g., the cross BEF element comprising BEFs 706 and 708) and a reflective polarizer (e.g., polarizer 701) in a dual LCD panel display improves (increases) the collimation of light asserted from the cross BEF element and reflective polarizer to the display's achromatic LCD panel (e.g., to achromatic LCD panel elements 712, 714, and 716 of FIG. 5), and increases brightness of images displayed by the display, and also increases contrast of images displayed by the display (e.g., by a factor of two), relative to what could be obtained without the cross BEF collimator and reflective polarizer. This effect is believed to be a result of the cross BEF collimator and reflective polarizer causing less light to be incident at the display's midstream diffuser (e.g., holographic mid-diffuser 718 of FIG. 5, to be described below) at obtuse angles and scattering at odd directions. Inclusion of a cross BEF element and reflective polarizer in a dual LCD panel display typically also increases the perceived contrast at wider angles, since less light ends up escaping in areas of the display screen that are meant to be dark.

The FIG. 5 embodiment includes an achromatic LCD panel (labeled "Laminated Achromatic LCD stack") which includes a passive initial polarizer 712, a passive analyzing polarizer 716, and an active elements panel 714 (implemented as an array of twisted nematic crystal ("TN") cells without color filters) between polarizers 712 and 714. The achromatic LCD panel also includes reflective polarizer (e.g., DBEF-D film) 710 on the backlight facing side. Elements 710, 712, 714, and 714 are preferably laminated together in the sequence shown.

Light transmitted through the achromatic LCD panel propagates toward the color LCD panel (labeled "Laminated Color LCD stack") which includes passive initial polarizer 720, a passive analyzing polarizer 724, and an active elements panel 722 (preferably implemented as an array of TN cells with a layer of color filters thereon) between polarizers 720 and 724. Elements 720, 722, and 724 are preferably laminated together.

Polarizers 712 and 716 of the achromatic LCD panel of FIG. 5 are preferably high contrast polarizers, and are oriented at 90 degree angles with respect to each other, preferably at a positive or negative 45 degree angle relative to the edge of array 714 when array's 714's cells are TN cells (or at a zero or 90 angle relative the edge of array 714 when array 714's cells are In-Plane-Switching or "IPS" LCD cells). The orientation of polarizer 712 should be rotated by 90 degrees relative to that of polarizer 716. The direction of polarization of elements 712 and 716 is crucial to make the achromatic LCD panel function as a light modulator which transmits light in response to higher drive values and shuts off light in response to lower drive values. Reflective polarizer 710, polarizer 712, array 714, and polarizer 716 are preferably laminated together (in the order shown) to reduce the air gap between the different layers in the achromatic LCD panel stack. This lamination step has been observed to improve the contrast ratio of the stack by about 8%.

As shown in FIG. 5, polarization-preserving diffuser 718 (preferably implemented as a holographic diffuser) is positioned between the achromatic LCD panel and the color LCD panel. Diffuser 718 functions to diffuse collimated light transmitted from the achromatic LCD panel while preserving its polarization. This prevents optical artifacts, e.g., color fringing and Moire patterns. Polarizer 716 (of the achromatic LCD panel) and polarizer 720 (of the color LCD panel), between which polarization-preserving diffuser 718 is sandwiched, are at the same polarization angle to allow the maximum light to pass through the display. Maintaining the correct relative orientation among the different polarization elements (712, 716, 720, and 724) of the two LCD panels of FIG. 5 is crucial to the correct working of the system.

One large benefit that is obtained by the FIG. 5 construction is that the multiple layers (elements 704, 706, 708, 718, and the achromatic and color LCD panels) act as a light baffle. Any stray light that enters the display from the viewer side has a high chance of being absorbed by the polarizers, color filters, or other layers in the stack. This ends up giving the display a dark appearance which helps the black levels in a well lit viewing environment.

The FIG. 5 system typically uses (includes or is coupled to) a processor (e.g., processor 804 of FIG. 6, which may be a PC) and/or other controller(s) to generate control signals for backlight 701 and the two LCD panels. As shown in FIG. 6, the backlight control values can be sent from processor 804 to a backlight controller board 806 (e.g., a CAT1042 LED controller board) that drives the edge-lit LEDs (702 and 703) of backlight 701. Processor 804 operates in response to an input image signal (stored therein or asserted thereto) to generate achromatic LCD panel drive values (e.g., 8-bit words as indicated in FIG. 6) for driving the cells of the achromatic LCD panel (identified as achromatic LCD panel 807 in FIG. 6) and to generate color LCD panel drive values (e.g., 8-bit words as indicated in FIG. 6) for driving the cells of the color LCD panel (identified as color LCD panel 808 in FIG. 6), preferably on a frame-by-frame basis in real time. As shown in FIG. 6, the LCD panel drive values are asserted from processor 804 to timing controller 805, which generates (and asserts to panels 807 and 808) drive signals in response to the drive values. In some embodiments of the inventive dual LCD panel display, processor 804 implements any of the LCD panel controller embodiments described in U.S. Provisional Patent Application No. 61/479,958, filed on Apr. 28, 2011, to generate the drive values for the display's color LCD panel and achromatic LCD panel.

Figure 7:
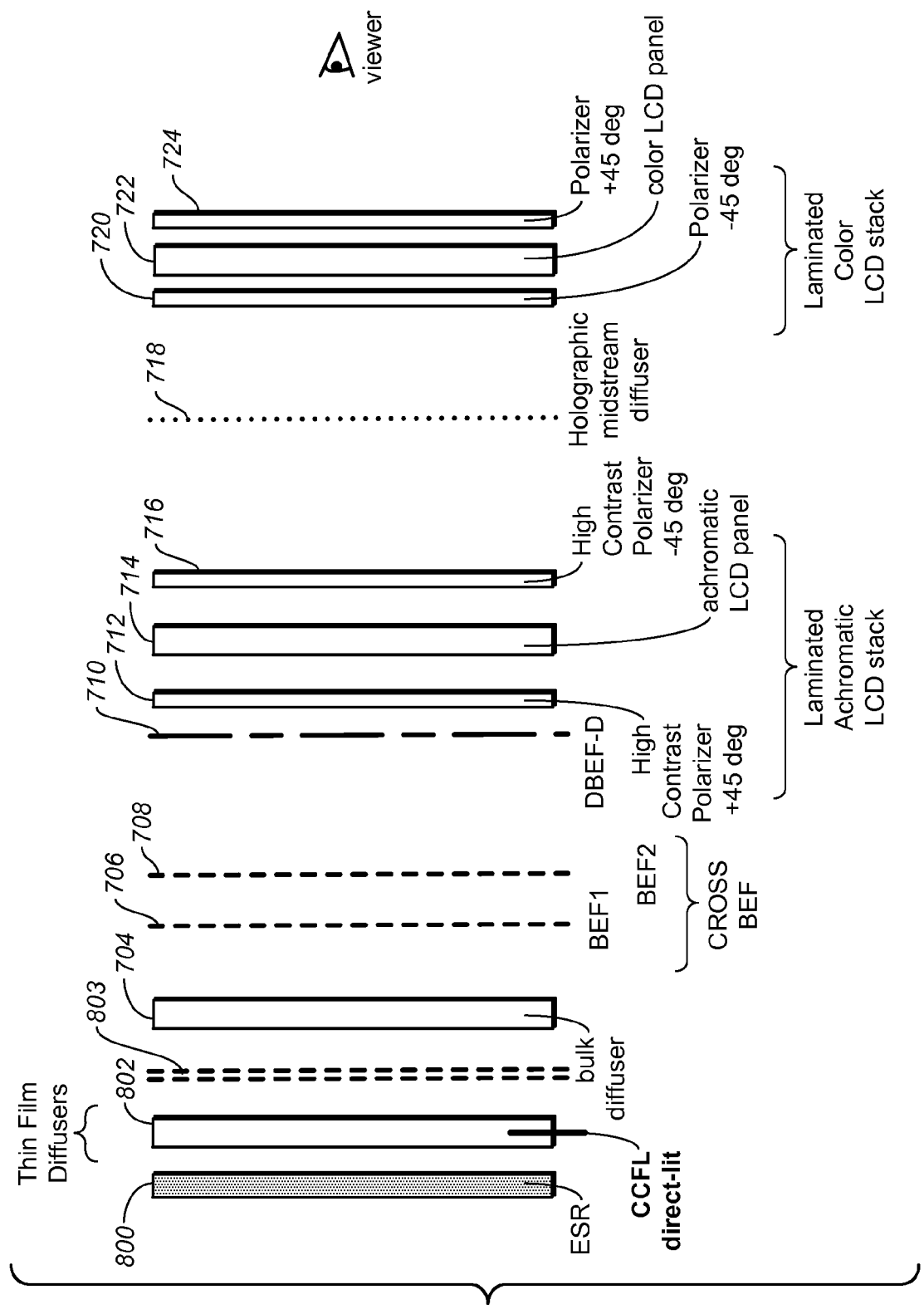
FIG. 7 is a simplified side cross-sectional view of elements of another embodiment of the inventive dual LCD panel display.

Another embodiment of the inventive display will next be described with reference to FIG. 7. The FIG. 7 embodiment of the inventive display differs from that of FIG. 5 in that the backlight assembly of FIG. 7 comprises a constant backlight source 802 (preferably implemented as a CCFL lamp), thin film diffusers 803 in front of backlight source 802, and a reflector 800 behind (downstream from) backlight source 802. Reflector 800 improves the efficiency of the backlight assembly by reflecting backlight emitted from backlight source 802 toward the achromatic LCD panel. All elements of FIG. 7 other than the backlight assembly may be identical to the identically numbered elements of FIG. 5, and the description thereof will not be repeated with reference to FIG. 7. A controller (e.g., controller elements 804 and 805 of FIG. 6) is employed to drive the achromatic LCD panel and color LCD panel of FIG. 7. No backlight control is needed in the FIG. 7 embodiment.

Figure 8:
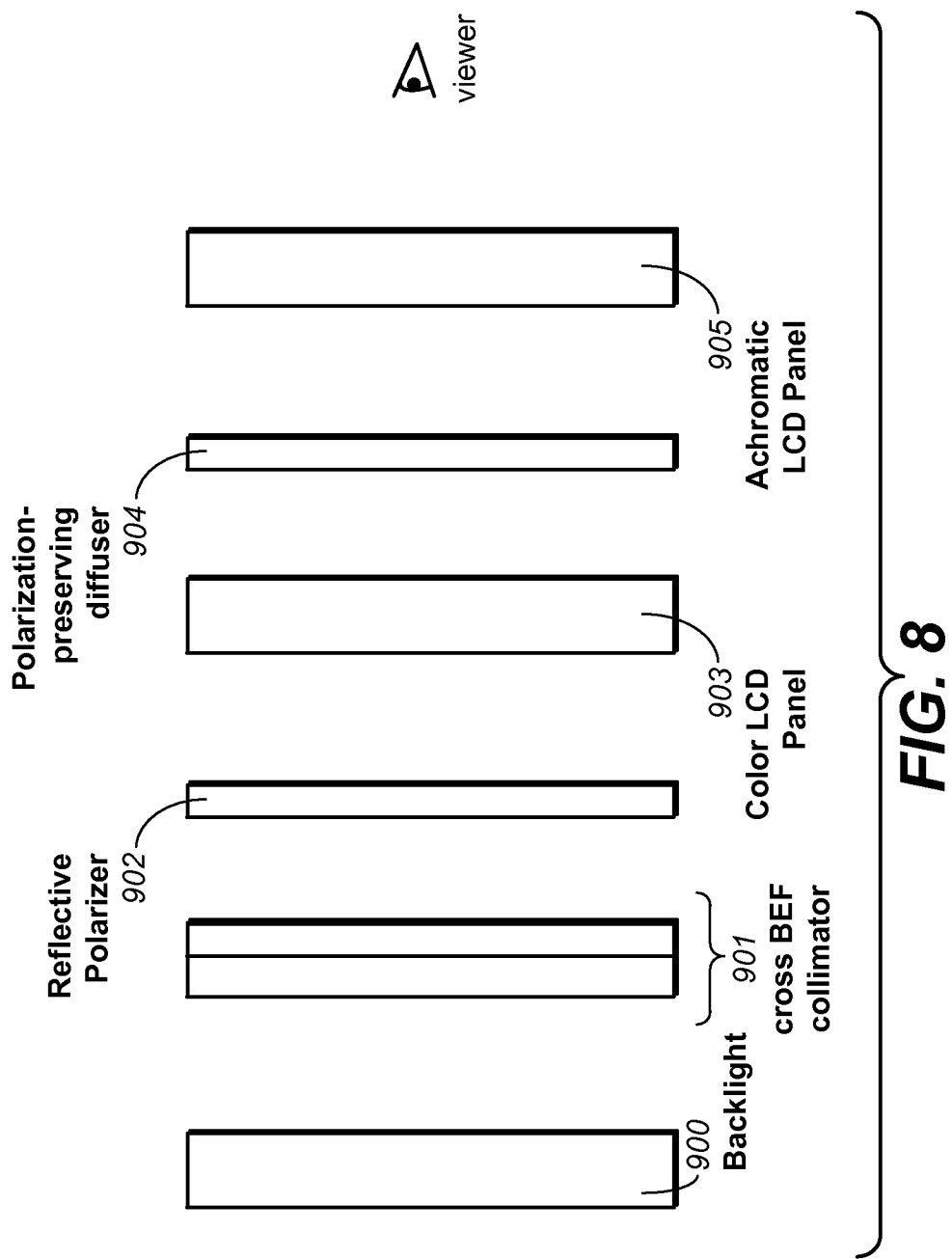
FIG. 8 is a simplified side cross-sectional view of elements of another embodiment of the inventive dual LCD panel display.

FIG. 8 is an alternative embodiment of the inventive dual LCD panel display in which the color LCD panel (panel 903, sometimes referred to herein as an "image-generating" panel) is positioned upstream of the achromatic LCD panel (panel 905). In FIG. 8, cross BEF collimator 901 is positioned between backlight 900 and color LCD panel 903, and polarization-preserving diffuser 904 (preferably implemented as a holographic diffuser) is positioned between color LCD panel 903 and achromatic LCD panel 905. Each of color LCD panel 903 and achromatic LCD panel 905 includes an active layer (including LCD cells) between an initial polarizer and an analyzing polarizer. Color LCD panel 903 includes two polarizers (an initial polarizer and an analyzing polarizer) and transmits light having a specific polarization, polarization-preserving diffuser 904 preserves the polarization of this light, and achromatic LCD panel 905 (which also includes two polarizers: an initial polarizer and an analyzing polarizer) further modulates the light diffused by polarization-preserving diffuser 904.

Reflective polarizer 902 of FIG. 8 (preferably implemented as a DBEF-D film) is positioned between cross BEF collimator 901 and color LCD panel 903. The collimated light propagating from cross BEF collimator 901 toward color LCD panel 903 is given a strong polarization bias by reflective polarizer 902, which reflects incorrectly polarized light back toward collimator 901. Reflective polarizer 902 should be oriented relative to the initial polarizer of color LCD panel 903 such that the polarization of the light transmitted by the reflective polarizer matches that of the light transmitted by the initial polarizer. Preferably, cross BEF collimator 901 together with reflective polarizer 902 create a lensing effect which collimates and polarizes light incident at cross BEF collimator 901 at obtuse angles (from backlight 900), and recycles (reflects back toward backlight 900) light that is incident at cross BEF collimator 901 at other (non-obtuse angles) in order to improve the overall efficiency of the optical stack.

Some embodiments of the present invention provide extended viewing angles. The use of conventional LCD panels (without red, green or blue color filters) as achromatic LCD panels allows for much greater resolution of contrast enhancement, when each achromatic LCD panel is used as a background or foreground panel with another (color LCD) panel. This extra resolution becomes even more important when an achromatic LCD panel is coupled a color LCD panel having a different resolution, as it allows for adjustable viewing angles across the display with minimized visual artifacts.

In the case that the achromatic LCD panel of some embodiments of the inventive display has pixels (referred to as "sub-pixels" since they are smaller than pixels of the color LCD panel in the same image chain) in clusters of four in a square configuration (each 2×2 cluster of subpixels of the achromatic panel aligned with one pixel of the color LCD panel), greater control is possible as this doubles the resolution in both horizontal and vertical directions. Existing image processing techniques for image scaling can be applied to these sub-pixel clusters if treated as individual control points, allowing for variable viewing angles and distances. To widen viewing angles (e.g., to accommodate multiple simultaneous viewers), a Gaussian or similar low pass filter can be applied to the achromatic panel drive values (e.g., by bilateral filtering module 478 of FIG. 4C, configured to perform spatial and range filtering).

In some embodiments, the inventive display includes modulators in addition to an achromatic LCD panel and a color LCD panel. For example, one such display includes three modulating LCD panels (e.g., two achromatic LCD panels and a color LCD panel). For example, an additional controllable array of polarizers between color LCD panel 724 of FIG. 5 (or FIG. 7) and the viewer could steer light at an output of the display at different polarization angles, either in a linear or circular manner. By using such a display system in conjunction with 3D polarized glasses, displayed objects could be steered to either the left or right eye of the viewer based on the modulation drive for the additional controllable array of polarizers. The stereoscopic-driving layer could be driven in any of many different ways, using spatial, temporal, or color based stereoscopic methods alongside traditional two-dimensional content, alone or simultaneously.

In typical embodiments, the inventive dual LCD panel display includes a color LCD panel, at least one achromatic LCD panel, a backlight, a cross BEF ("brightness enhancing film") collimator between the backlight and the achromatic LCD panel, and a polarization-preserving diffuser between the achromatic LCD panel and the color LCD panel. More generally, other embodiments of the invention are a dual panel display including an image-generating panel (e.g., a color LCD panel but alternatively another image-generating panel), at least one contrast-enhancing panel (e.g., at least one achromatic LCD panel, but alternatively another contrast-enhancing panel), a backlight, a polarization-preserving diffuser between the contrast-enhancing panel and the image-generating panel, and a cross BEF ("brightness enhancing film") collimator between the backlight and one of the image-generating panel and the contrast-enhancing panel. Each of the contrast-enhancing panel and the image-generating panel includes an active layer (which can be driven to modulate light) between an initial polarizer and an analyzing polarizer. Thus, in a typical embodiment, the contrast-enhancing panel includes two polarizers (an initial polarizer and an analyzing polarizer) and transmits light having a specific polarization, the polarization-preserving diffuser preserves the polarization of this light, and the image-generating panel (which also includes two polarizers: an initial polarizer and an analyzing polarizer) further modulates the light diffused by the polarization-preserving diffuser. The positions of the two panels are reversed in some other embodiments, so that the image-generating panel is upstream from the contrast-enhancing panel.

Preferably, the contrast-enhancing panel is positioned upstream of the image-generating panel (in the sense that the contrast-enhancing panel is between the backlight and the image-generating panel), and a reflective polarizer (implemented as a DBEF-D film, in some embodiments) is positioned between the cross BEF collimator and the contrast-enhancing panel. The collimated light propagating from the cross BEF collimator toward the contrast-enhancing panel is given a strong polarization bias by the reflective polarizer, which reflects incorrectly polarized light back toward the cross BEF collimator. The reflective polarizer should be oriented relative to the initial polarizer of the contrast-enhancing panel such that the polarization of the light transmitted by the reflective polarizer matches that of the light transmitted by the initial polarizer. Preferably, the cross BEF collimator together with the reflective polarizer create a lensing effect which collimates and polarizes light incident at the cross BEF collimator at obtuse angles (from the backlight), and recycles (reflects back toward the backlight) light that is incident at the cross BEF collimator at other (non-obtuse angles) in order to improve the overall efficiency of the optical stack. Alternatively, the reflective polarizer is positioned between the cross BEF collimator and the image-generating panel, in embodiments in which the image-generating panel is upstream of the contrast-enhancing panel.

It should be understood that in the broad class of embodiments described in the two preceding paragraphs, both panels generate images, and both panels impart contrast into a final image for display. The image-generating panel typically imparts color and contrast through a combination of filtering and brightness modulation, and the contrast-enhancing panel typically imparts contrast, or enhancing contrast, via brightness modulation. It should also be understood that in variations on the described embodiments, the contrast-enhancing panel could also include color filtering, or other variations of function in one or both of the contrast-enhancing panel and the image-generating panel could be implemented.

It should be recognized that the color LCD panel of each of FIGS. 5, 6, 7, and 8 is an example of an image-generating panel (and is replaced by an image-generating panel that is not a color LCD panel in some embodiments of the invention), and that the achromatic LCD panel of each of FIGS. 5, 6, 7, and 8 is an example of a contrast-enhancing panel and is replaced by a contrast-enhancing panel that is not an achromatic LCD panel in some embodiments of the invention.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to panels, LCDs, polarizers, controllable panels, displays, filters, glasses, software, and/or algorithms, etc. should also be considered in light of any and all available equivalents.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A dual panel display, comprising:
   an image-generating panel;
   at least one contrast-enhancing panel;
   a backlight, positioned such that light from the backlight illuminates the the contrast-enhancing panel, and light transmitted through the contrast-enhancing panel illuminates the image-generating panel;
   a controller, the controller receiving input image data and sending control signals to the backlight to emit a low resolution version of the input image data;
   a polarization-preserving diffuser between the contrast-enhancing panel and the image-generating panel, said polarization-preserving diffuser comprising a holographic diffuser; and
   a cross BEF collimator between the backlight and the contrast-enhancing panel;
   a reflective polarizer between the backlight and the contrast-enhancing panel, wherein the backlight, the cross BEF collimator, the reflective polarizer, the contrast-enhancing panel, the polarization-preserving diffuser and the image-generating panel are arranged in this order.

2. The dual panel display of claim 1, wherein the contrast-enhancing panel is positioned between the backlight and the image-generating panel, the contrast-enhancing panel is configured to transmit modulated light having a specific polarization, and the polarization-preserving diffuser is configured and oriented to diffuse the modulated light while preserving the polarization of said modulated light.

3. The dual panel display of claim 2, also including the reflective polarizer oriented relative to the initial polarizer of the contrast-enhancing panel such that the polarization of light transmitted by the reflective polarizer matches that of the light transmitted by said initial polarizer.

4. The dual panel display of claim 3, wherein the reflective polarizer is a diffusing Dual Brightness Enhancement Film film.

5. The dual panel display of claim 3, wherein the reflective polarizer, the initial polarizer of the contrast-enhancing panel, the active layer of the contrast-enhancing panel, and the analyzing polarizer of the contrast-enhancing panel are laminated together, and the initial polarizer of the image-generating panel, the active layer of the image-generating panel, and the analyzing polarizer of the image-generating panel are laminated together.

6. The dual panel display of claim 1, wherein the image-generating panel is positioned between the backlight and the contrast-enhancing panel, the image-generating panel is configured to transmit modulated light having a specific polarization, and the polarization-preserving diffuser is configured and oriented to diffuse the modulated light while preserving the polarization of said modulated light.

7. The dual panel display of claim 6, also including a reflective polarizer positioned between the cross BEF collimator and the image-generating panel, with the reflective polarizer oriented relative to the initial polarizer of the image-generating panel such that the polarization of light transmitted by the reflective polarizer matches that of the light transmitted by said initial polarizer.

8. The dual panel display of claim 7, wherein the reflective polarizer is a diffusing Dual Brightness Enhancement Film film.

9. The dual panel display of claim 7, wherein the reflective polarizer, the initial polarizer of the image-generating panel, the active layer of the image-generating panel, and the analyzing polarizer of the image-generating panel are laminated together, and the initial polarizer of the contrast-enhancing panel, the active layer of the contrast-enhancing panel, and the analyzing polarizer of the contrast-enhancing panel are laminated together.

10. The dual panel display of claim 1, wherein said dual panel display comprises a dynamic range of greater than 800 to 1.

11. The dual panel display of claim 1, wherein said dual panel display is a dual LCD panel display, the image-generating panel is a color LCD panel, and the contrast-enhancing panel is an achromatic LCD panel.

12. The dual LCD panel display of claim 11, wherein the achromatic LCD panel is positioned between the backlight and the color LCD panel, the achromatic LCD panel is configured to transmit modulated light having a specific polarization, the polarization-preserving diffuser is configured and oriented to diffuse the modulated light while preserving the polarization of said modulated light, the color LCD panel is configured to modulate light having an input polarization, and the polarization of the modulated light transmitted by the achromatic LCD panel matches the input polarization of the color LCD panel.

13. The dual LCD panel display of claim 12, also including a reflective polarizer positioned between the cross BEF collimator and the achromatic LCD panel, with the reflective polarizer oriented relative to the initial polarizer of the achromatic LCD panel such that the polarization of light transmitted by the reflective polarizer matches that of the light transmitted by said initial polarizer.

14. The dual LCD panel display of claim 13, wherein the reflective polarizer is a diffusing Dual Brightness Enhancement Film film.

15. The dual LCD panel display of claim 13, wherein the reflective polarizer, the initial polarizer of the achromatic LCD panel, the active layer of the achromatic LCD panel, and the analyzing polarizer of the achromatic LCD panel are laminated together, and the initial polarizer of the color LCD panel, the active layer of the color LCD panel, and the analyzing polarizer of the color LCD panel are laminated together.

16. The dual LCD panel display of claim 11, wherein the color LCD panel is positioned between the backlight and the achromatic LCD panel, the color LCD panel is configured to transmit modulated light having a specific polarization, and the polarization-preserving diffuser is configured and oriented to diffuse the modulated light while preserving the polarization of said modulated light.

17. The dual LCD panel display of claim 16, also including a reflective polarizer positioned between the cross BEF collimator and the color LCD panel, with the reflective polarizer oriented relative to the initial polarizer of the color LCD panel such that the polarization of light transmitted by the reflective polarizer matches that of the light transmitted by said initial polarizer.

18. The dual LCD panel display of claim 17, wherein the reflective polarizer is a diffusing Dual Brightness Enhancement Film film.

19. The dual LCD panel display of claim 17, wherein the reflective polarizer, the initial polarizer of the color LCD panel, the active layer of the color LCD panel, and the analyzing polarizer of the color LCD panel are laminated together, and the initial polarizer of the achromatic LCD panel, the active layer of the achromatic LCD panel, and the analyzing polarizer of the achromatic LCD panel are laminated together.

* * * * *